US009432314B2

(12) United States Patent
Thomas et al.

(10) Patent No.: US 9,432,314 B2
(45) Date of Patent: Aug. 30, 2016

(54) QUICK NAVIGATION OF MESSAGE CONVERSATION HISTORY

(71) Applicant: MICROSOFT TECHNOLOGY LICENSING, LLC, Redmond, WA (US)

(72) Inventors: Shawn Thomas, Woodinville, WA (US); Jason Nelson, Redmond, WA (US); Rowan Forster, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 14/483,943

(22) Filed: Sep. 11, 2014

(65) Prior Publication Data

US 2016/0050165 A1 Feb. 18, 2016

Related U.S. Application Data

(60) Provisional application No. 62/037,721, filed on Aug. 15, 2014.

(51) Int. Cl.
*G06F 3/0481* (2013.01)
*H04L 12/58* (2006.01)
(Continued)

(52) U.S. Cl.
CPC ............ *H04L 51/04* (2013.01); *G06F 3/0482* (2013.01); *G06F 3/0485* (2013.01); *G06F 3/0488* (2013.01); *G06F 3/04817* (2013.01); *G06F 3/04855* (2013.01); *G06K 9/2054* (2013.01); *G06Q 10/10* (2013.01); *G06Q 10/107* (2013.01);
(Continued)

(58) Field of Classification Search
CPC .. G06F 3/0481; G06F 3/0482; G06F 3/0488; G06Q 10/10; H04L 12/581; H04L 12/1813; H04L 41/22
See application file for complete search history.

(56) References Cited

U.S. PATENT DOCUMENTS 8,412,845 B2 * 4/2013 Katis .................. H04L 12/1827 370/468
8,554,861 B2 10/2013 Christie et al.
(Continued)

OTHER PUBLICATIONS

"International Search Report and Written Opinion Issued in PCT Application No. PCT/US2015/044937", Mailed Date: Oct. 16, 2015, 11 Pages total.
(Continued)

*Primary Examiner* — Steven Sax
(74) *Attorney, Agent, or Firm* — Bryan Webster; Judy Yee; Micky Minhas

(57) ABSTRACT

A messaging application running on a computing device utilizes a navigation model that exposes user interfaces (UIs) which implement a messaging conversation history in a minimized form so that a user can quickly jump to a desired conversation displayed on a chat card without having to toggle back and forth between a conventional messaging list view and chat card views. The minimized conversation history can be implemented using a scrollable carousel of images that is persistently displayed on the UI. The images represent messaging participants (i.e., contacts) that are arranged in an ordered display according to conversation history. The particular contact that is associated with the currently displayed chat card is highlighted in the carousel using color and/or other graphic treatments. As messaging activities occur and new messages come in and are sent out, the carousel is dynamically updated to show the contacts in the appropriate sorted historical order.

16 Claims, 22 Drawing Sheets

(51) Int. Cl.

| | |
|---|---|
| ***G06F 3/0488*** | (2013.01) |
| ***G06Q 10/10*** | (2012.01) |
| ***H04L 12/18*** | (2006.01) |
| ***G06F 3/0482*** | (2013.01) |
| ***G06F 3/0485*** | (2013.01) |
| ***G06K 9/20*** | (2006.01) |
| ***G06Q 50/00*** | (2012.01) |

(52) U.S. Cl.

CPC ........... *G06Q 50/01* (2013.01); *H04L 12/1813* (2013.01); *H04L 51/00* (2013.01)

(56) References Cited

U.S. PATENT DOCUMENTS

| | | | | |
|---|---|---|---|---|
| 8,693,643 | B2 * | 4/2014 | Mikan | H04L 51/10 379/215.01 |
| 8,881,025 | B2 * | 11/2014 | Swink | H04L 51/32 715/752 |
| 2006/0047811 | A1 * | 3/2006 | Lau | H04L 12/586 709/225 |
| 2006/0168315 | A1 * | 7/2006 | Daniell | G06Q 10/107 709/237 |
| 2007/0186173 | A1 | 8/2007 | Both et al. | |
| 2008/0122796 | A1 * | 5/2008 | Jobs | G06F 3/0488 345/173 |
| 2009/0138828 | A1 * | 5/2009 | Schultz | G06Q 10/10 715/853 |
| 2010/0205563 | A1 | 8/2010 | Haapsaari et al. | |
| 2012/0210253 | A1 | 8/2012 | Luna et al. | |
| 2012/0260189 | A1 * | 10/2012 | Howard | H04M 1/72552 715/739 |
| 2012/0278388 | A1 | 11/2012 | Kleinbart et al. | |
| 2013/0279744 | A1 * | 10/2013 | Ingrassia, Jr. | G06F 21/32 382/103 |
| 2014/0082522 | A1 | 3/2014 | Gunderson et al. | |
| 2014/0189524 | A1 * | 7/2014 | Murarka | G06Q 50/01 715/744 |
| 2014/0189539 | A1 * | 7/2014 | St. Clair | G06F 3/048 715/753 |
| 2014/0310365 | A1 * | 10/2014 | Sample | H04L 51/16 709/206 |

OTHER PUBLICATIONS

Gautham, NS, "Android UI patterns What? Why? How?", Retrieved from <<http://www.slideshare.net/gauthamns/coding-modern-ui-actionbar-drag-drop-swipe-to-dismiss?from_action=save>>, Feb. 28, 2013, 5 Pages total.

"How to create Tabs in Android Application and add Tabs dynamically (Dependent on matching Users)—Stack Overflow", Retrieved from <<http://stackoverflow.com/questions/17722612/how-to-create-tabs-in-android-application-and-add-tabs-dynamicallydependent-on>>, Jul. 18, 2013, 3 Pages total.

Friedman, Lex, "Verbs IM for iPhone and iPad", Published on: Nov. 16, 2011,Available at: http://www.macworld.com/article/1163609/verbs_im_for_iphone_and_ipad.html (4 pages total).

Morris, Paul, "MessageSwiper for iPhone Enables Swipe Gestures in Messages App, Lets You Quickly Switch Between Conversation Streams", Published on: Apr. 15, 2013, Retrieved from: http://www.redmondpie.com/messageswiper-for-iphone-enables-swipe-gestures-in-messages-app-lets-you-quickly-switch-between-conversation-streams/ Retrieved on: Jun. 27, 2014 (4 pages total).

"Swipe Views", Published on: Feb. 15, 2014, Retrieved from: http://developer.android.com/design/patterns/swipe-views.html Retrieved on: Jun. 27, 2014 (3 pages total).

Williams, Ty, "BlackBerry Q10 Gestures Overview", Published on: May 23, 2013, Retrieved from: http://helpblog.blackberry.com/2013/05/blackberry-q10-gestures-overview/ Retrieved on: Jun. 27, 2014 (6 pages total).

Herbert, Chris, "iOS 7: Tips, Tricks, and Details", Published on: Sep. 18, 2013, Retrieved from: http://www.macstories.net/roundups/ios-7-tips-tricks-and-details/ Retrieved on: Jun. 27, 2014 (38 pages total).

Raja, Haroon Q, "Ubuntu Touch Preview: A Complete Hands-on Feature & Interface Analysis", Published on: Feb. 25, 2013, Retrieved from: http://www.addictivetips.com/ubuntu-linux-tips/ubuntu-touch-preview-a-complete- hands-on-feature-interface-analysis/ Retrieved on: Jun. 27, 2014 (20 pages total).

* cited by examiner

100

QUICK NAVIGATION OF MESSAGE CONVERSATION HISTORY

STATEMENT OF RELATED APPLICATIONS

This application claims benefit and priority to U.S. Provisional Application Ser. No. 62/037,721 filed Aug. 15, 2014, entitled "QUICK NAVIGATION OF MESSAGE CONVERSATION HISTORY" which is incorporated herein by reference in its entirety.

BACKGROUND

Messaging applications are some of the most heavily used particularly on mobile devices such as smartphones and tablet computers. Users may have multiple conversations happening simultaneously and often desire an ability to multitask within a single application. Viewing new messages from multiple different contacts can often involve a time consuming and arduous process of forward and back navigation between a conversation list and individual chat cards.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A messaging application running on a computing device utilizes a navigation model that exposes user interfaces (UIs) which support messaging conversation histories in a minimized form so that a user can quickly jump to a desired conversation displayed on a chat card without having to toggle back and forth between a conventional messaging list view and chat card views. The minimized conversation history can be implemented using a scrollable carousel of images that is persistently displayed (i.e., "stickied"), for example, near the top of a chat card shown by the UI. The images represent messaging participants (i.e., contacts) that are arranged in an ordered display according to conversation history. The particular contact that is associated with the currently displayed chat card is highlighted in the carousel using color and/or other graphic treatments such as objects, icons, glyphs, animation, etc. As messaging activities occur and new messages come in and are sent out, the carousel is dynamically updated to show the contacts in the appropriate sorted historical order.

Using the device's touchscreen or other input device, a user can swipe horizontally on a displayed chat card to reveal other chat cards—one at a time in historical order—from other contacts and the carousel is updated to highlight the corresponding contact for a displayed card. The user can also horizontally scroll the carousel to reveal other contacts with which conversations took place in the user's history. When a contact is selected from the carousel (e.g., using a touch or other input) the contact is highlighted and the UI shows the corresponding chat card.

The carousel may be configured to expose user controls such as buttons to invoke various actions in support of a particular messaging user experience. For example, a button may be displayed that enables a user to change between the minimized conversation history UI using the carousel and chat cards to a more conventional list view, but one that is historically ordered in the same way as the carousel. In alternative arrangements, a zooming feature can be supported (e.g., using a multi-touch pinch gesture or other input) so that the minimized conversation history UI can be zoomed out to show the conversation list.

The messaging application may be configured to automatically populate the carousel for the user and in some cases, the user may provide input to the carousel population methodology by setting preferences and/or using controls to actively manage carousel membership and/or its configuration or other features. For example, the user may remove a contact from the carousel using a touch and flick gesture or some other input, or manually add a contact to the carousel in some cases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

Figure 1:
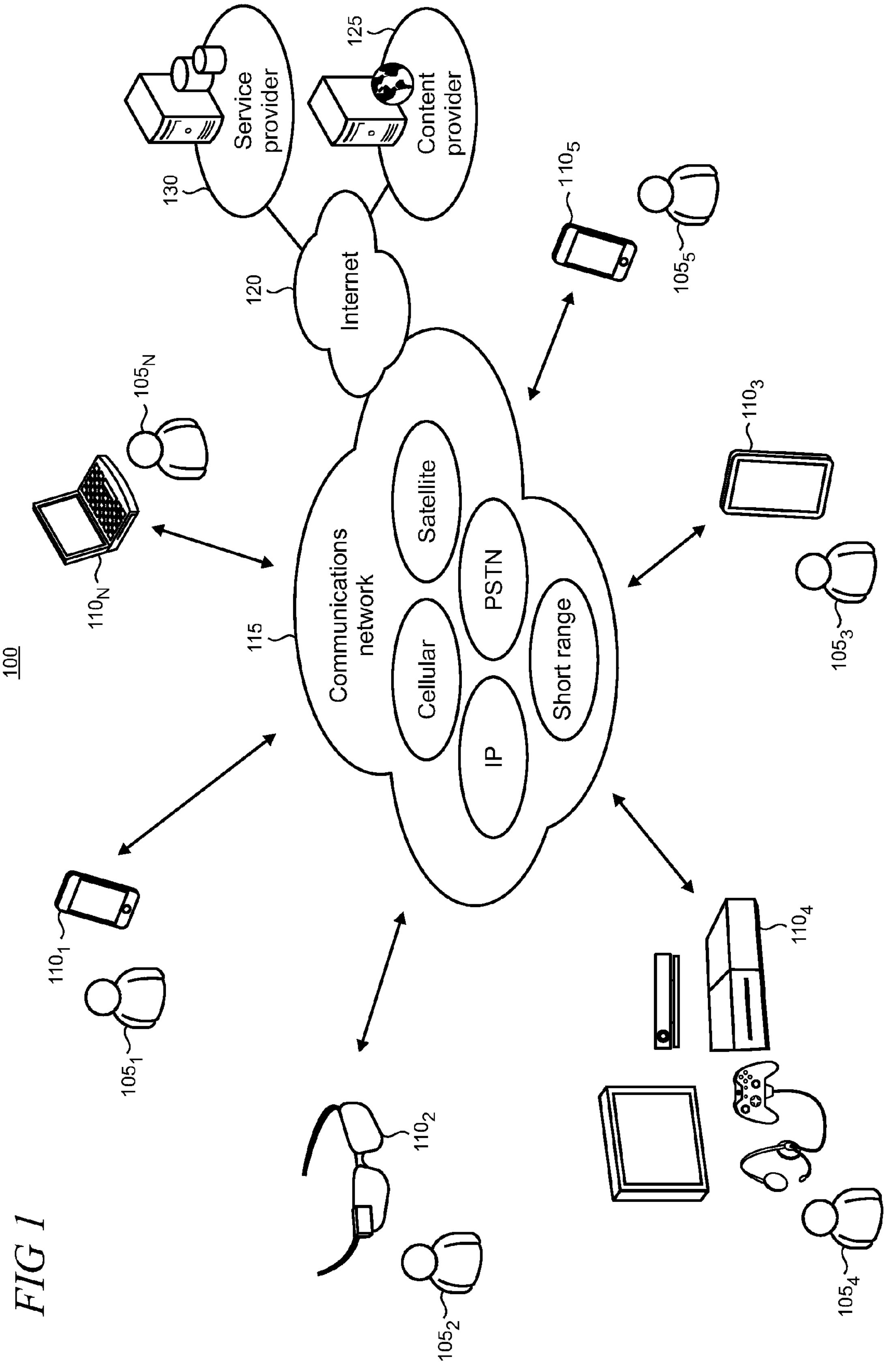
FIG. 1 shows an illustrative environment in which devices having communications capabilities interact over a network.

Like reference numerals indicate like elements in the drawings. Elements are not drawn to scale unless otherwise indicated. It is emphasized that the particular UIs displayed in the drawings can vary from what is shown according to the needs of a particular implementation. While UIs are shown in portrait mode in the drawings, the present arrangement may also be implemented using a landscape mode.

DETAILED DESCRIPTION

FIG. 1 shows an illustrative environment 100 in which various users 105 employ respective devices 110 that communicate over a communications network 115. The devices 110 provide various communication capabilities, such as voice and video calling and messaging, and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting), use applications and access services that employ data, browse the World Wide Web, and the like. However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, phablet devices (i.e., combination smartphone/tablet devices), wearable computers, navigation devices such as GPS (Global Positioning System) systems, laptop PCs (personal computers), desktop computers, multimedia consoles, gaming systems, or the like. In the discussion that follows, the use of the term “device” is intended to cover all devices that are configured with communication capabilities and are capable of connectivity to the communications network 115.

The various devices 110 in the environment 100 can support different features, functionalities, and capabilities (here referred to generally as “features”). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access the communications network 115 in order to implement various user experiences. The communications network can include any of a variety of network types and network infrastructure in various combinations or sub-combinations including cellular networks, satellite networks, IP (Internet Protocol) networks such as Wi-Fi and Ethernet networks, a public switched telephone network (PSTN), and/or short range networks such as Bluetooth networks. The network infrastructure can be supported, for example, by mobile operators, enterprises, Internet service providers (ISPs), telephone service providers, data service providers, and the like. The communications network 115 typically includes interfaces that support a connection to the Internet 120 so that the mobile devices 110 can access content provided by one or more content providers 125 and access a service provider 130 in some cases.

Figure 2:
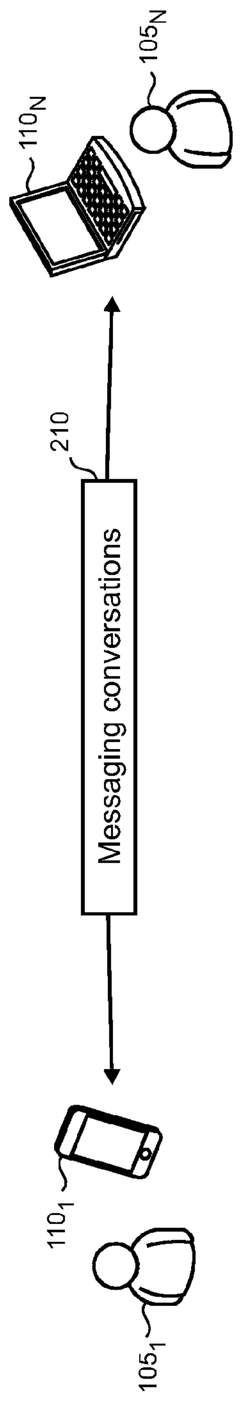
FIG. 2 shows an illustrative messaging conversation between devices.

The devices 110 and communications network 115 may be configured to enable device-to-device communication. As shown in FIG. 2, such device-to-device communication can include, for example, messaging conversations 210. Support for the device-to-device messaging conversation 210 may be provided using various applications that run on a device 110.

Figure 3:
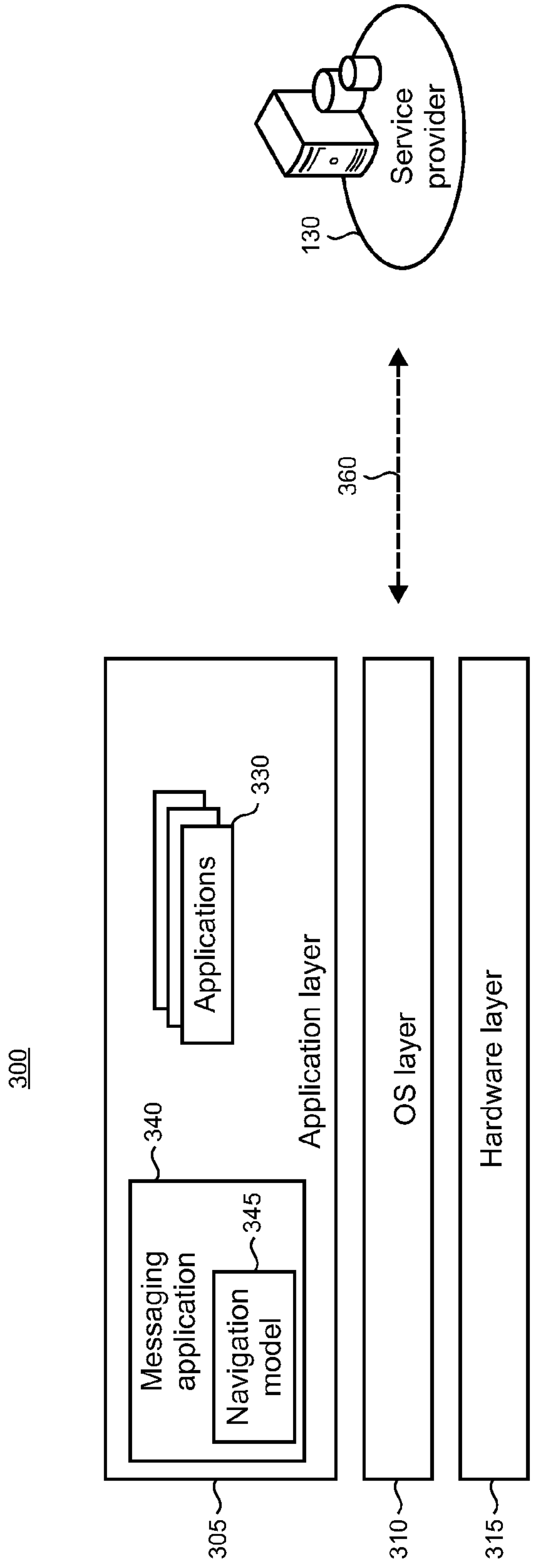
FIG. 3 shows an illustrative layered architecture that includes a messaging application.

For example, FIG. 3 shows an illustrative layered architecture 300 that may be instantiated on a given device 110 that supports the applications. The architecture 300 is typically implemented in software, although combinations of software, firmware, and/or hardware may also be utilized in some cases. The architecture 300 is arranged in layers and includes an application layer 305, an OS (operating system) layer 310, and a hardware layer 315. The hardware layer 315 provides an abstraction of the various hardware used by the device 110 (e.g., input and output devices, networking and radio hardware, etc.) to the layers above it.

The application layer 305 in this illustrative example supports various applications 330 (e.g., web browser, map application, email application, etc.), as well as a messaging application 340 that supports a navigation model 345, as described in more detail below. The applications are often implemented using locally executing code. However in some cases, these applications may rely on services and/or remote code execution provided by remote servers or other computing platforms such as those supported by the service provider 130 or other cloud-based resources as indicated by line 360. While the applications 330 and 340 are shown here as components that are instantiated in the application layer 305, it may be appreciated that the functionality provided by a given application may be implemented, in whole or part, using components that are supported in either the OS or hardware layers.

Figure 5:
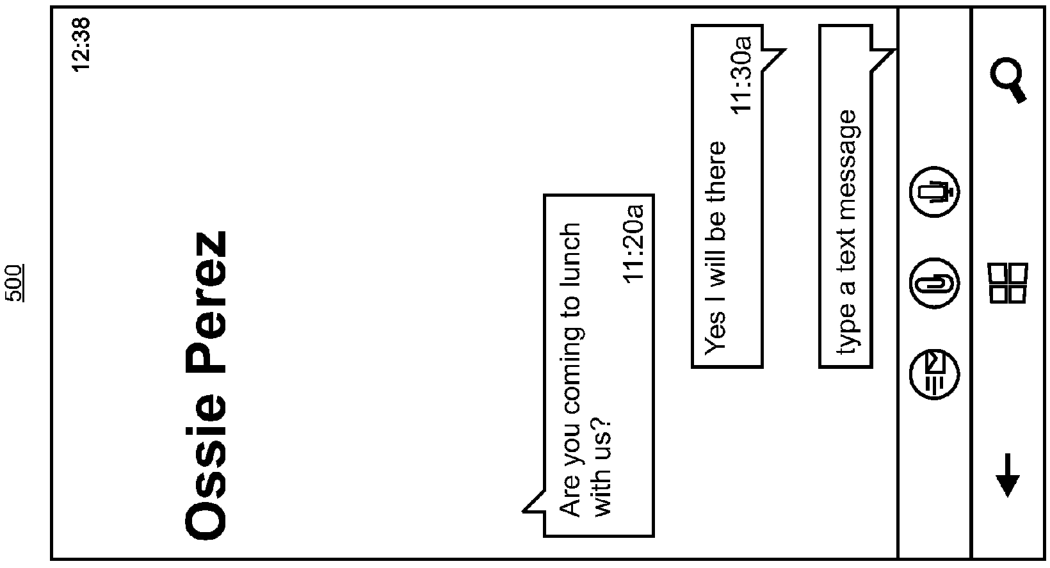
FIGS. 4 and 5 show screen captures of illustrative user interfaces (UIs) exposed by a typical conventional messaging application.
Figure 4:
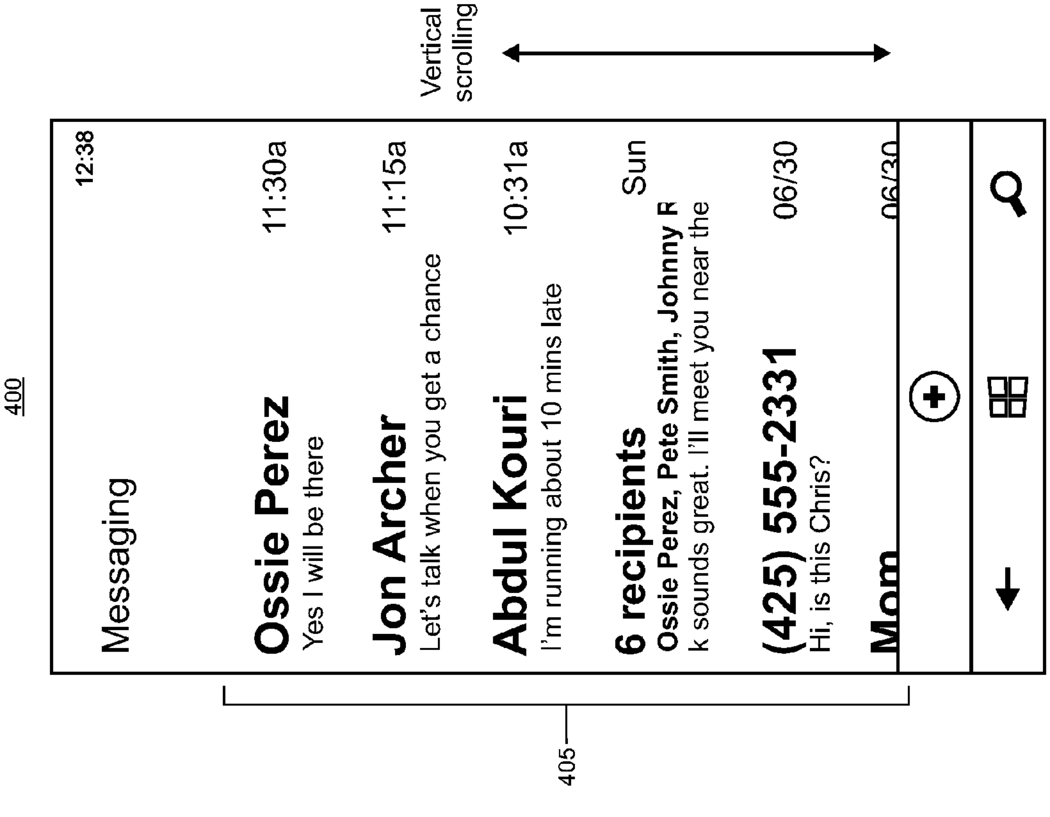

FIGS. 4 and 5 respectively show screen captures of illustrative user interfaces (UIs) 400 and 500 exposed by a typical conventional messaging application supported on a device 110 (FIG. 1). As shown in FIG. 4, UI 400 displays a list 405 of messaging participants (referred to a “contacts”) that are configured to be vertically scrollable so that off screen contacts can be brought into view. The vertical scrolling can typically be implemented by the user, depending on the type of device, by interacting with controls on the device, interacting with a touchscreen, and the like.

To see a particular conversation in this conventional arrangement, for example with a touch screen device, the user can tap an entry on the list view 405 and the UI changes to display the conversation with the contact, as indicated by reference numeral 500 in FIG. 5. In this illustrative example, incoming messages from the contact are shown on the left and outgoing messages from the device user are shown on the right. As new messages are generated during the messaging conversation 210 (FIG. 2) and new incoming messages from contacts are received, the user typically needs to navigate back and forth between the list view shown in FIG. 4 and the conversation view shown in FIG. 5 in order to engage in the conversations. That is, once the user is interacting with the UI that is supporting the conversation, the user typically cannot continue to navigate within the conventional messaging application without re-launching the list view. This issue can be exacerbated when the user is multi-tasking and engaging in multiple messaging conversations as the user needs to expend more steps to reach a desired user experience and the device is expending more resources (e.g., processing cycles and battery life in some cases) to redraw each screen of information displayed by the application's UI.

Figure 6:
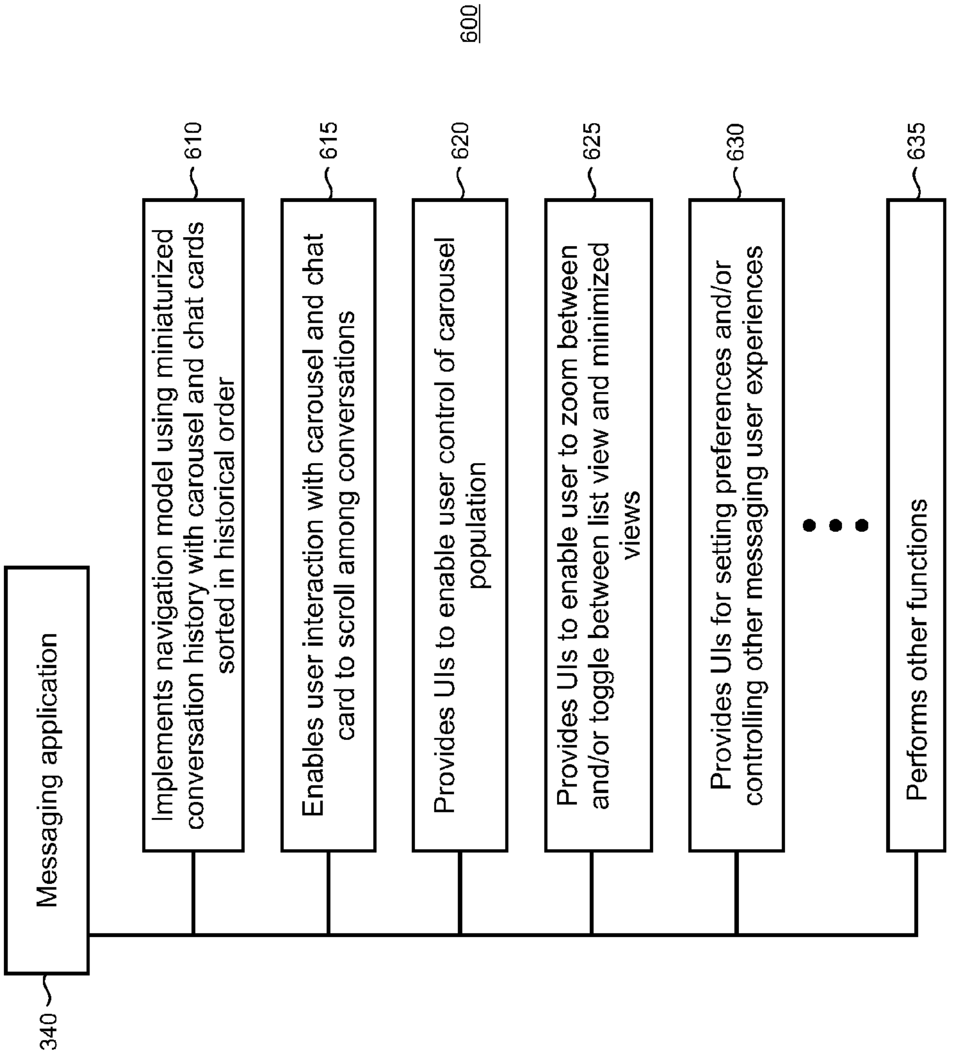
FIG. 6 shows an illustrative taxonomy of functions implemented by a messaging application that supports the present quick navigation of message conversation history.

In comparison to a conventional messaging application, the present messaging application 340 (FIG. 3) supports and enables quick navigation among messaging conversations by utilizing a minimized view of conversations and bypassing the traditional conversation list view when it is not needed. FIG. 6 shows an illustrative taxonomy of functions 600 that may typically be supported by messaging application 340. The functions 600 illustratively include implementing a navigation model using a miniaturized conversation history with a contact carousel and chat cards sorted in historical order (as indicated by reference numeral 610 in FIG. 6); enabling user interaction with the carousel and chat cards to scroll among messaging conversations (615); providing UIs to enable user control over carousel membership (620); providing UIs to enable the user to zoom between and/or toggle between a traditional list view and the present minimized view (625); providing UIs for setting preferences and/or controlling other messaging user experiences (630); and performing various other functions (635). The list of functions 600 is not intended to be exhaustive and other functions may be provided by the messaging application 340 as may be needed for a particular implementation of the present quick navigation of message conversation history.

Figure 7:
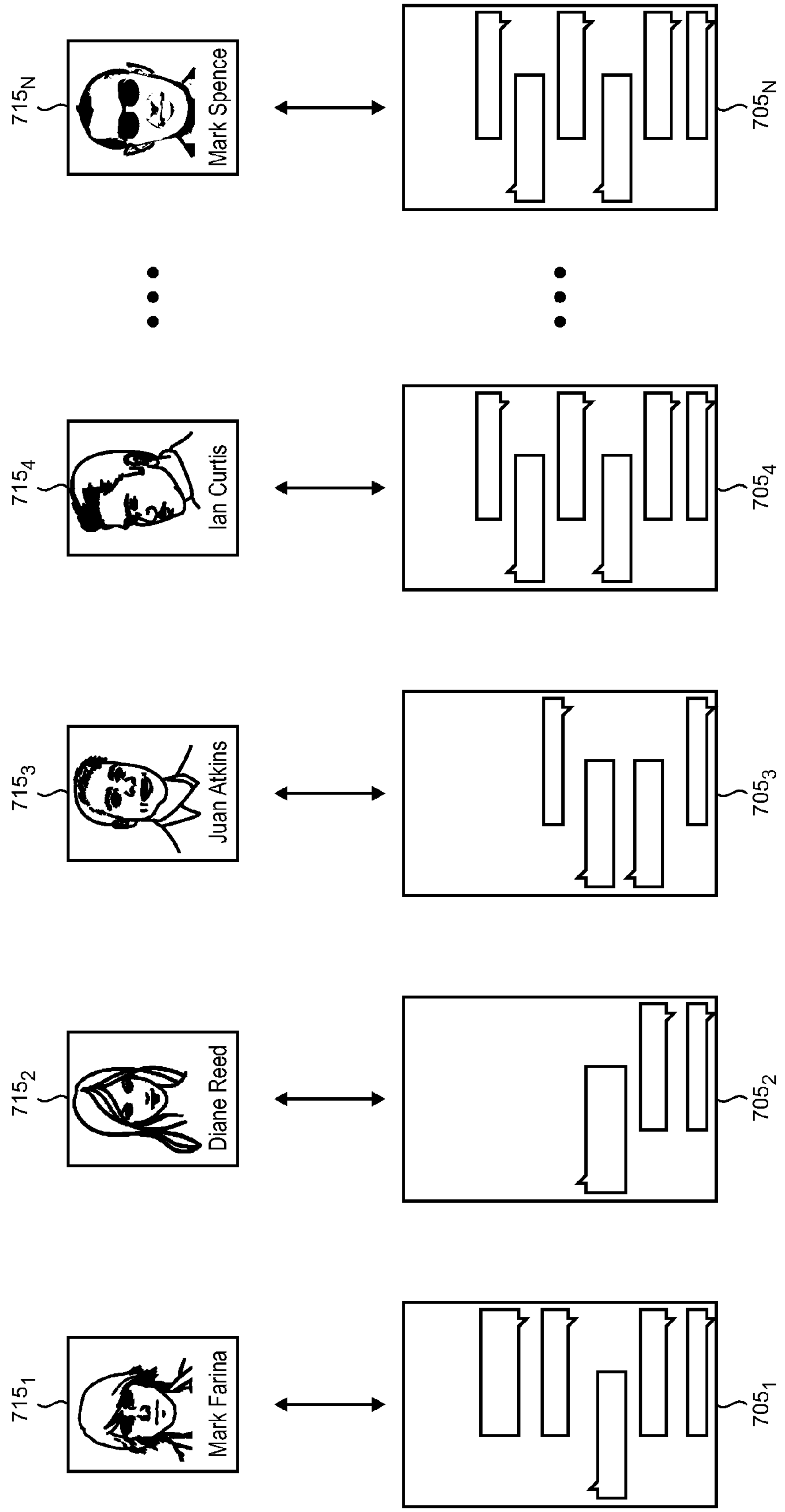
FIG. 7 shows an illustrative group of chat cards in which each chat card is associated with a particular contact.

The present navigation model 345 (FIG. 3) may be implemented by associating an individual chat card with a contact and then representing that contact in a user-scrollable carousel display that is persisted on the chat card, for example near the top of the chat card on the UI. As shown in FIG. 7, each chat card 705 shows messages flowing between the user and a respective contact 715 in which incoming messages are shown on the left of the card and outgoing messages are shown on the right (for sake of clarity in exposition, only the text balloons are illustrated and the message text is not shown). Typically, a chat card is configured so that the most recent messages are positioned near the bottom of the card and the user can vertically scroll up to see older messages in a conversation.

Each contact can be represented by images, avatars, names, graphic objects, combinations thereof, and/or similar types of identifiers to uniquely identify the contact. For example, if an image is not available to the messaging application 340 then, for example, the contact's name or initials and/or a default image can be utilized. In this particular illustrative example, both an image and name are displayed for each contact 715, as shown, but other arrangements and configurations may be utilized to suit a particular implementation. Different images can be utilized to indicate group messaging conversations as well.

Figure 8A:
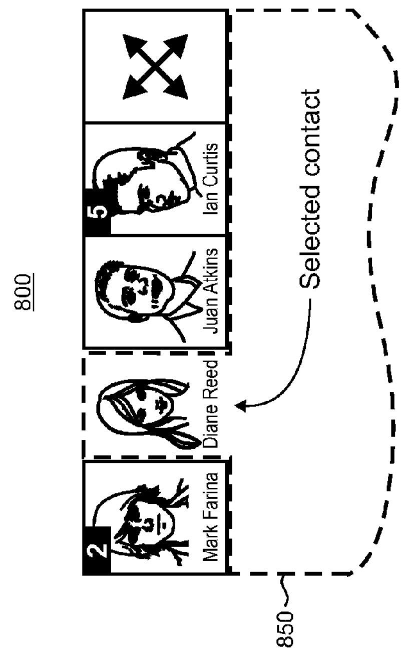
FIGS. 8, 8A, and 9 show a portion of an illustrative UI exposed by the messaging application in which contacts are arranged in a scrollable carousel.
Figure 8:
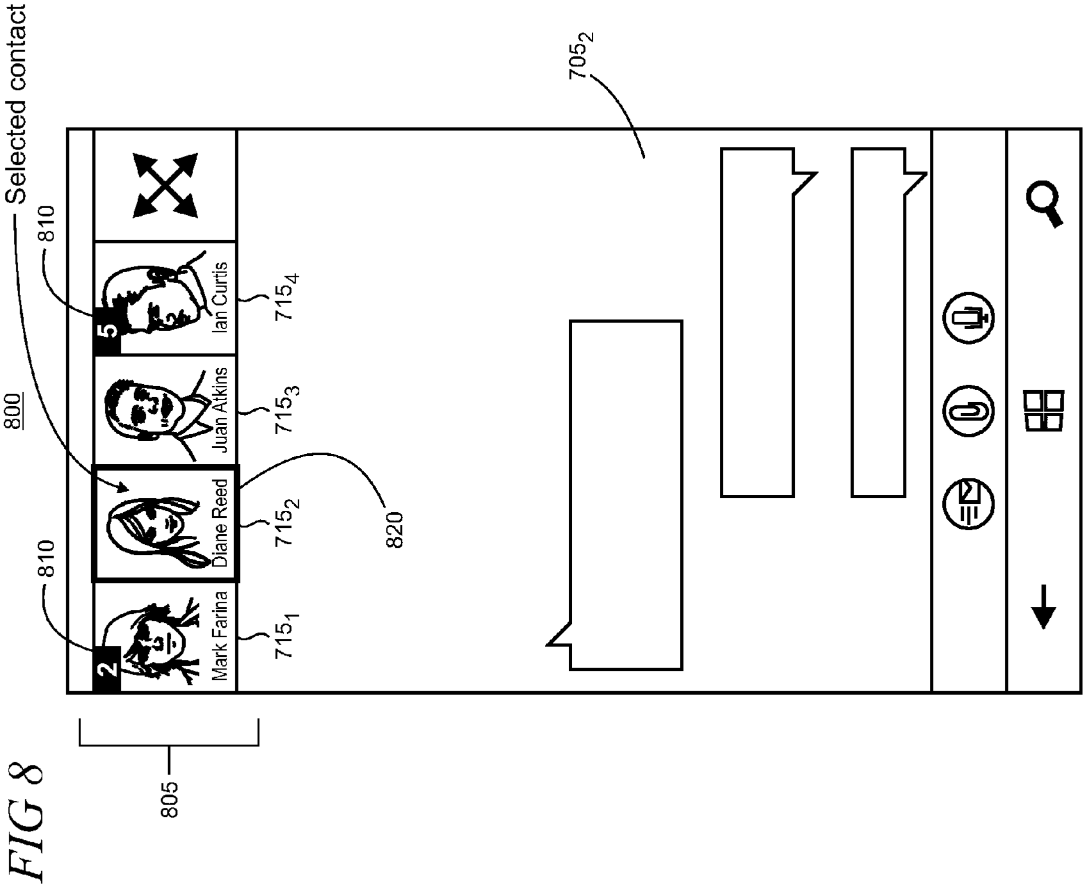

FIG. 8 depicts a UI 800 in which the contacts 715 are located in a user-scrollable and dynamically moveable carousel 805 that is positioned on the chat card (in this example, chat card 705$_2$ that is associated with contact 715$_2$). As shown, the carousel 805 is positioned near the top of the chat card, however, other positions can also be utilized as may be needed to suit a particular implementation of the present quick navigation. The carousel 805 in this example shows four contacts at a time, but other configurations can be utilized that show more or fewer contacts depending on the needs of a given implementation. The carousel is moveable through user action or through control from the messaging application to reveal additional contacts that are members of the carousel. That is, the carousel can be logically larger than what can be displayed on the UI at one time.

Typically, the carousel 805 is persisted or stickied in position on the chat card so that it is displayed even as the chat cards are themselves swapped out. In the description that follows, user interaction with the UIs is discussed in the context of a device that exposes a touch screen interface. However, it is noted that other types of inputs can also be utilized according to the features supported on a given device such as physical or virtual button presses, gesture inputs into a gesture recognition device/software, voice commands, natural language inputs, etc.

The carousel 805 is typically populated automatically by the messaging application 340 according to rules employed by the navigation model. In addition to imposing a sort order based on conversation history, for example by using the timestamps associated with each incoming and outgoing message, the rules can also determine which and how many contacts to place in the carousel. For example, if the user has a large number of conversations, the size of the carousel may become unwieldy if every conversation is included in it. Thus, additional criteria may be applied by the rules to determine carousel membership such as time criteria so that conversations which are older than some threshold time period (e.g., a month ago, a year ago, etc.) are not included. In some cases, rule application may result in a minimally populated carousel so that the displayed portion of the carousel on the UI is left with blank entries. Rule application can also be performed subject to user input and/or user preferences so that carousel membership can be populated by taking other attributes into account. For example, a user may wish a carousel to include only personal contacts, but not job-related contacts. In some implementations, the messaging application 340 can be configured to support multiple carousels so that the user can have a different carousel for different contact groups (which can have overlapping members in some cases) and employ the carousels for different purposes. The messaging application can surface the appropriate UIs to enable the user to select attributes, set preferences, and control carousel population in some implementations.

Manual additions and deletions of contacts to the carousel can be supported in some cases. In addition, the rules can be configured to apply context and learning in some implementations so that automated carousel population can be tailored to a specific user's behaviors over time. For example, if the user continually deletes a given contact or group of contacts from the carousel, the messaging application may determine that some contacts (such as those sharing a common email domain) are not desired for inclusion in the carousel and the application will not automatically populate them in the future. In some implementations, the messaging application can surface an option to the user to enable or disable the application of contextual learning when automatically populating the carousel.

One or more new message indicators 810 may be displayed to show that respective contacts 715 have an associated chat card containing unread messages. As the user accesses the new messages on a given chat card, the new message indicator 810 will clear for that chat card. In this illustrative example, the contact 715 having the most recent messages (whether incoming or outgoing, read or unread) is positioned on the far left of the carousel 805 and the rest of the contacts are sorted by conversation history going to the right of the carousel. Thus, a conversation with contact $\mathbf{715}_1$ includes a message that is more recent than a message in a conversation with contact $\mathbf{715}_2$ and so on. The messaging application 340 can dynamically update the carousel 805 to change the sort order and display of the contacts 715 when new messages are generated and new messages come in.

The carousel 805 also includes a selection highlight 820 that indicates which contact 715 is associated with the currently displayed chat card on the UI 800. In this example, the selection highlight is shown as a rectangular graphic object. However other ways of showing a highlight can also be utilized using color and/or other graphic treatments such as objects, icons, glyphs, animation, etc. In addition, as shown in FIG. 8A, a tabbed visual effect may be alternatively used, as indicated by the dashed line 850, to highlight the selected contact. As the chat cards are changed on the UI, for example through user interaction, the selection highlight 820 or tab 850 will move to the appropriate contact 715 that corresponds to the currently displayed chat card. The messaging application 340 may need to scroll or move the carousel 805 in some cases so that the highlighted contact is viewable by the user on the displayed portion of the carousel.

In some implementations, when the messaging application 340 is launched on a device, the leftmost contact in the carousel having the most recent messaging history is highlighted by default and the corresponding chat card is shown on the UI. In some cases this default application behavior can be overridden by the user on a per instance basis or modified by settings expressed in the application user preferences.

Figure 9:
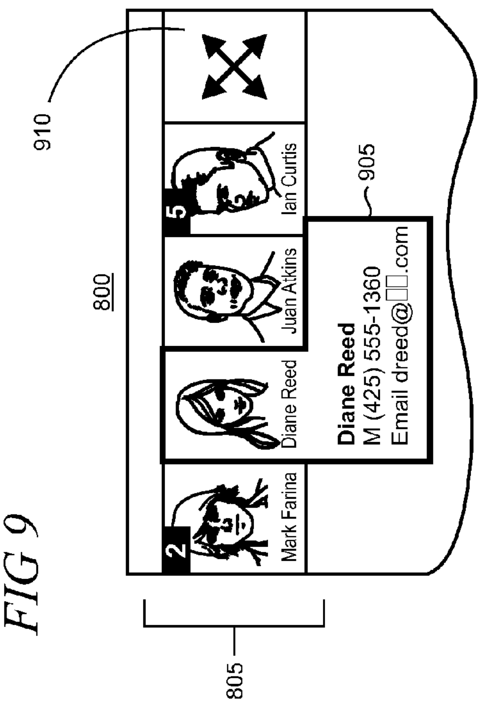

The displayed contacts can be configured to expose additional functionality in some implementations. For example, as shown in FIG. 9, by tapping and holding on a contact on a device using a touch screen or by providing some other input, additional information 905 pertaining to the contact is displayed on the UI. In this illustrative example, the contact's name, mobile telephone number, and email are shown, however the particular information displayed or other functionality provided can vary by implementation. For example, the exposed information may include links to external content, include controls to launch related applications such a calling and/or email application, etc. The carousel 805 may also expose user controls such as button 910 that may be used to invoke additional functionality, as described in more detail below.

Figure 10:
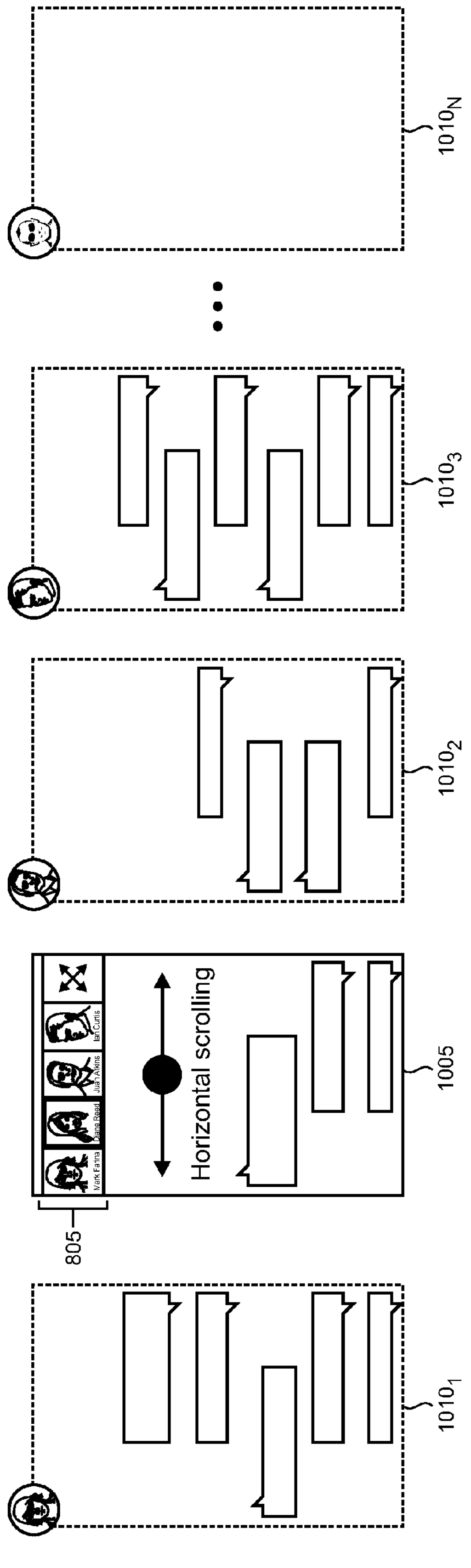
FIG. 10 illustratively shows how chat cards are logically arranged for quick access using horizontal scrolling of the UI.

As noted above, the UIs exposed by the messaging application 340 are configured to enable the user to interact with both the chat cards and carousel. For example, as shown in FIG. 10, additional chat cards are logically positioned for access from the currently displayed chat card 1005 using horizontal scrolling. The chat cards are logically ordered to correspond with their respective contacts in the carousel 805. Thus, in this illustrative example, an accessible chat card $\mathbf{1010}_1$ is logically positioned to the left of the currently displayed chat card 1005 and other accessible cards $\mathbf{1010}_2$, $\mathbf{1010}_3$ . . . $\mathbf{1010}_N$ are logically positioned to the right where N is equal to the number of contacts that are populated into the carousel.

Figure 11:
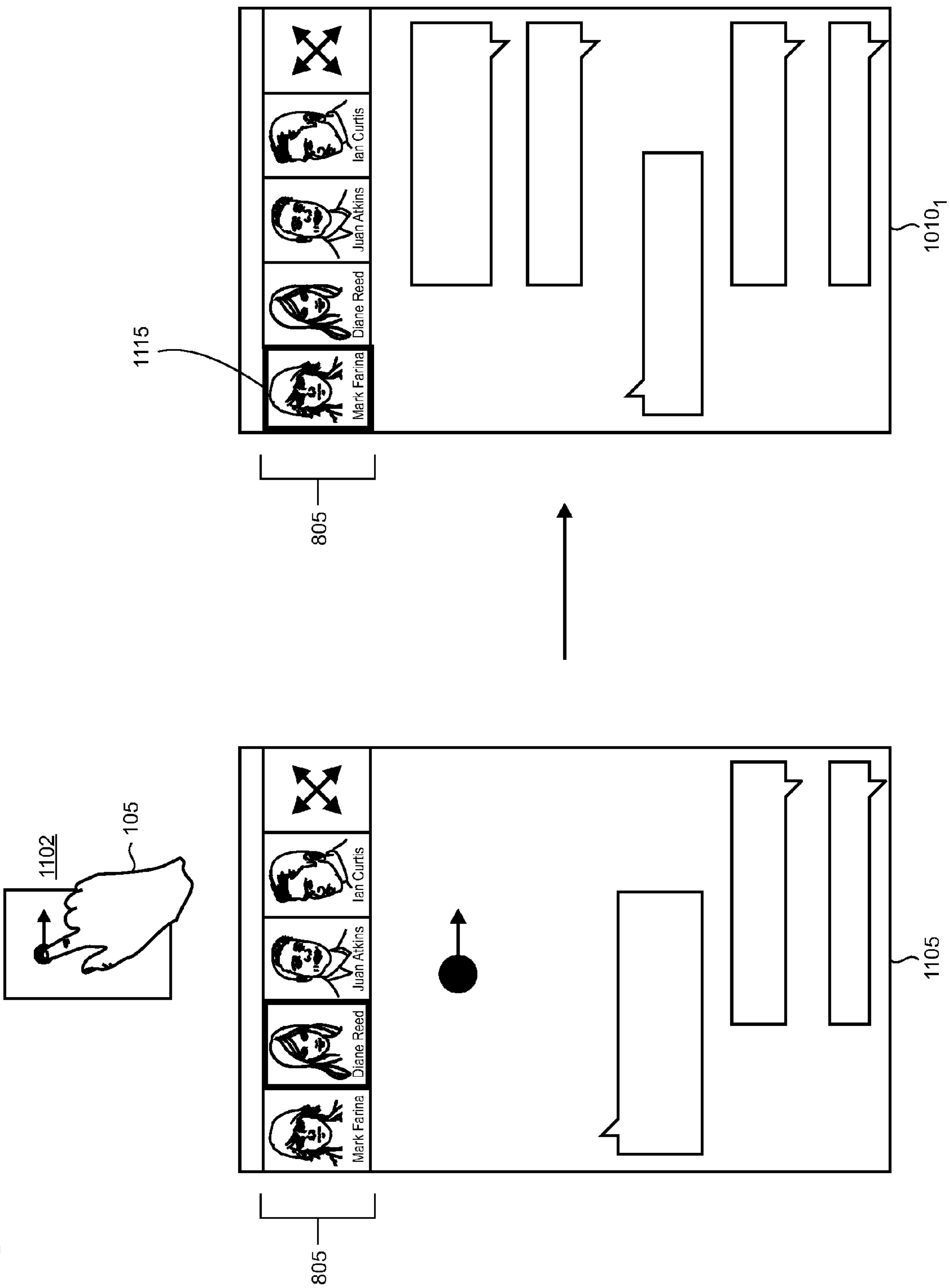
FIGS. 11 and 12 illustratively show how the UI may be swiped to navigate between conversations on chat cards.
Figure 12:
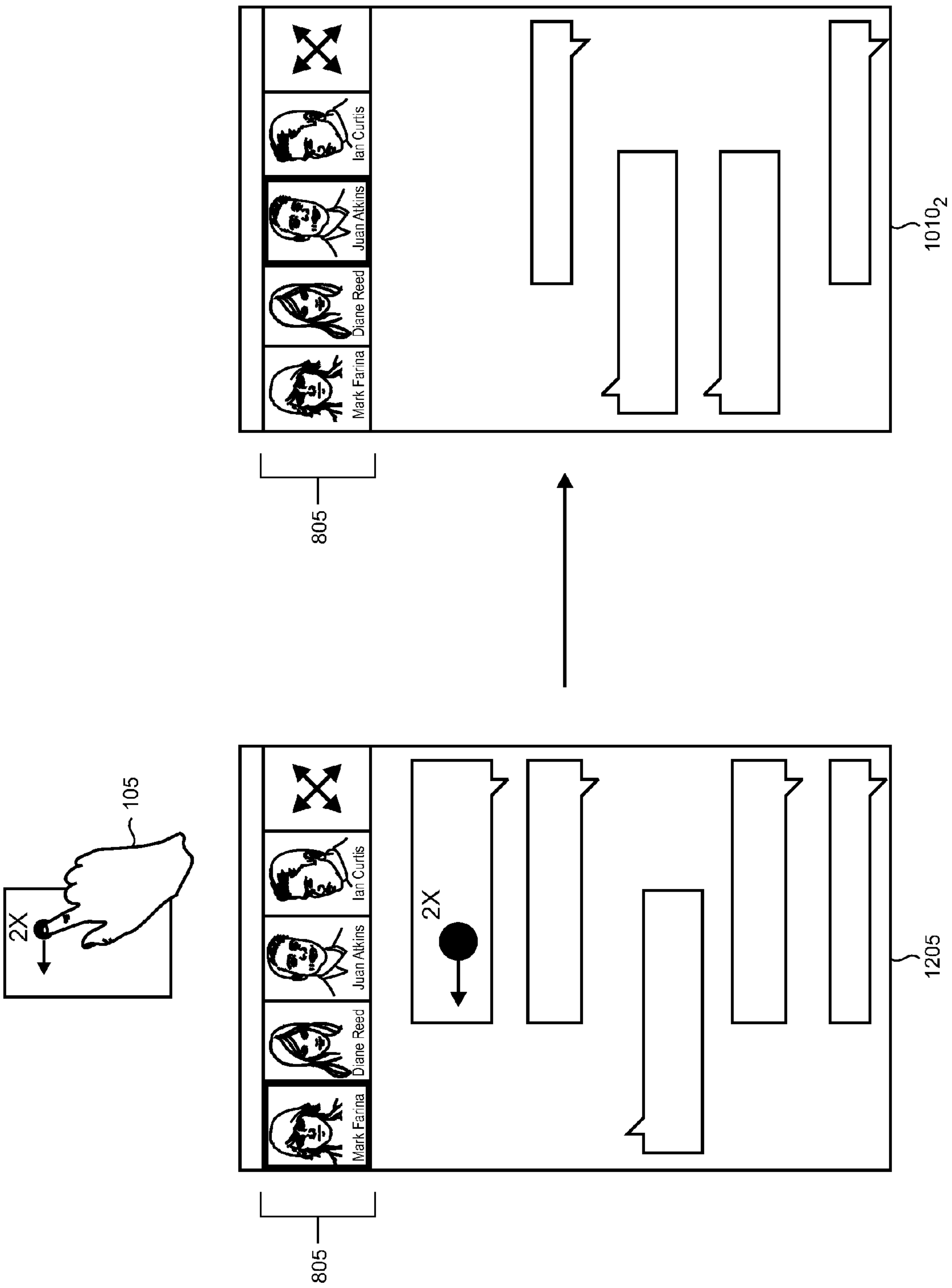

In this illustrative example, the user can navigate among the chat cards 1010 by touching and dragging the currently displayed card to the right or left. Alternative touch gestures may also be used such as flicking And as noted above, other types of non-touch inputs may also be utilized in some cases. As shown in the inset drawing 1102 in FIG. 11, the user 105 can drag the current chat card 1105 to the right to reveal the chat card $\mathbf{1010}_1$. The highlight 1115 is updated to a new position on the carousel 805 to reflect the swapped chat card. As shown in FIG. 12, the user 105 can drag the currently displayed chat card 1205 to the left to reveal other chat cards. In this example, the user 105 has performed a left drag operation twice to show a chat card $\mathbf{1010}_2$ for a contact that is two positions to the right from the previously displayed chat card. In some implementations, a discrete touch and drag gesture is utilized to reveal each chat card, while in others a single gesture can be used to continuously scroll the cards. The chat cards can also be configured for motion as if freewheeling so that a touch and drag or flick gesture will cause the cards to continuously scroll for a period of time until stopped, for example, by another touch by the user 105. It may be appreciated that various types of scrolling motions can be implemented to meet the needs of a particular application. In some cases, sounds (e.g., clicks, etc.) may be played on the device to enhance the sense of chat card motion.

Figure 13:
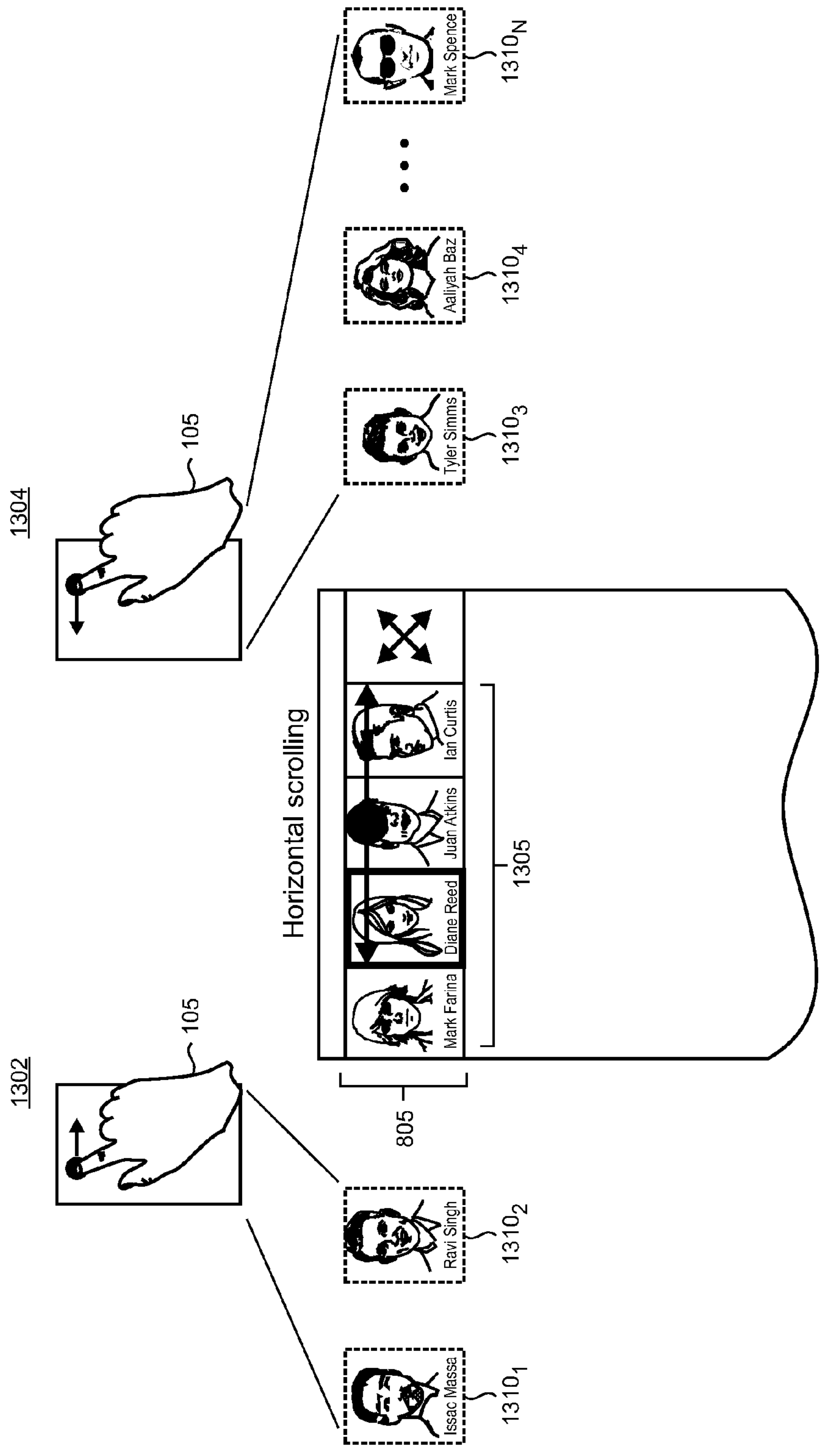
FIGS. 13 and 14 illustratively show how the UI may be swiped to reveal additional contacts on the carousel.
Figure 14:
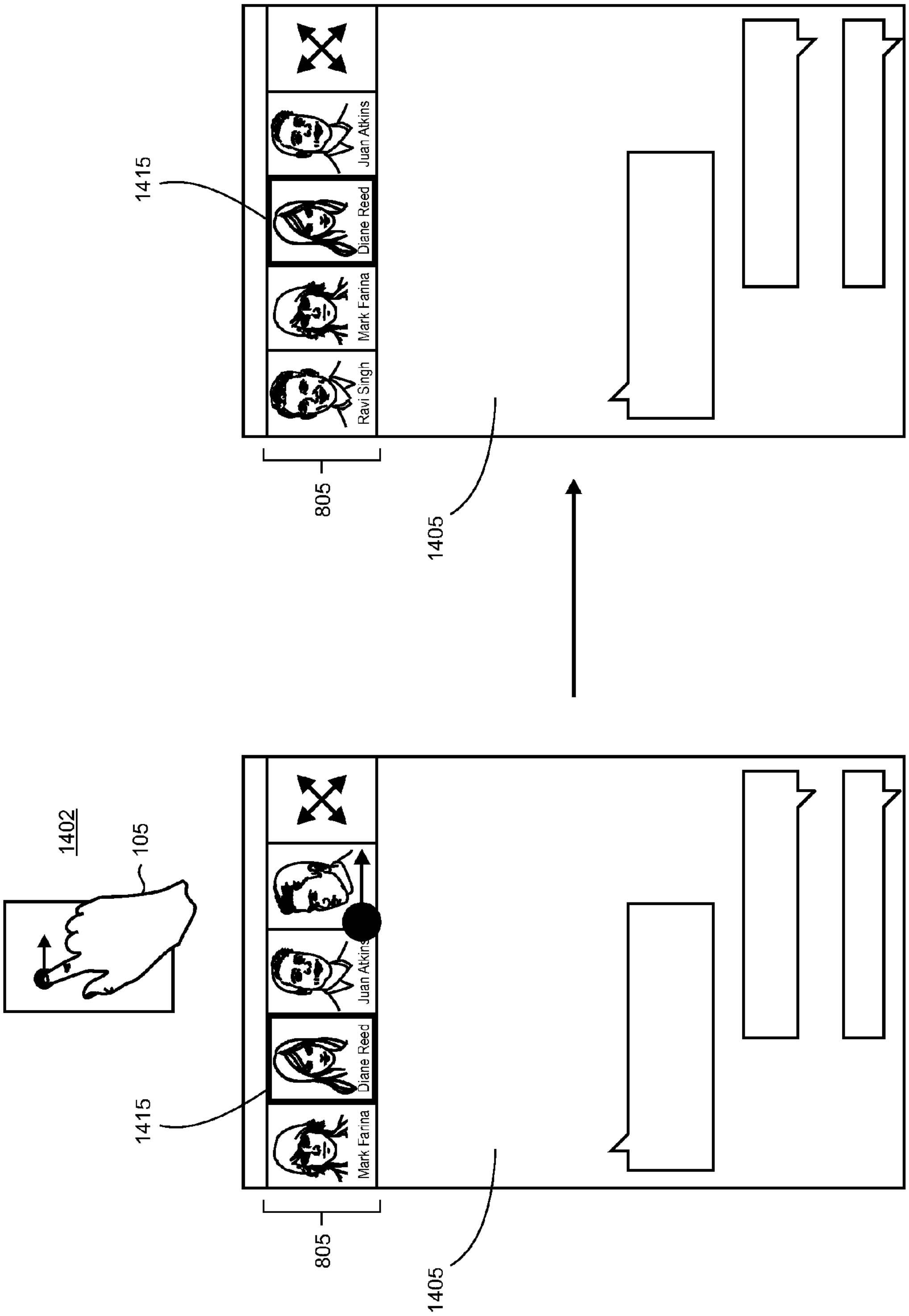
Figure 15:
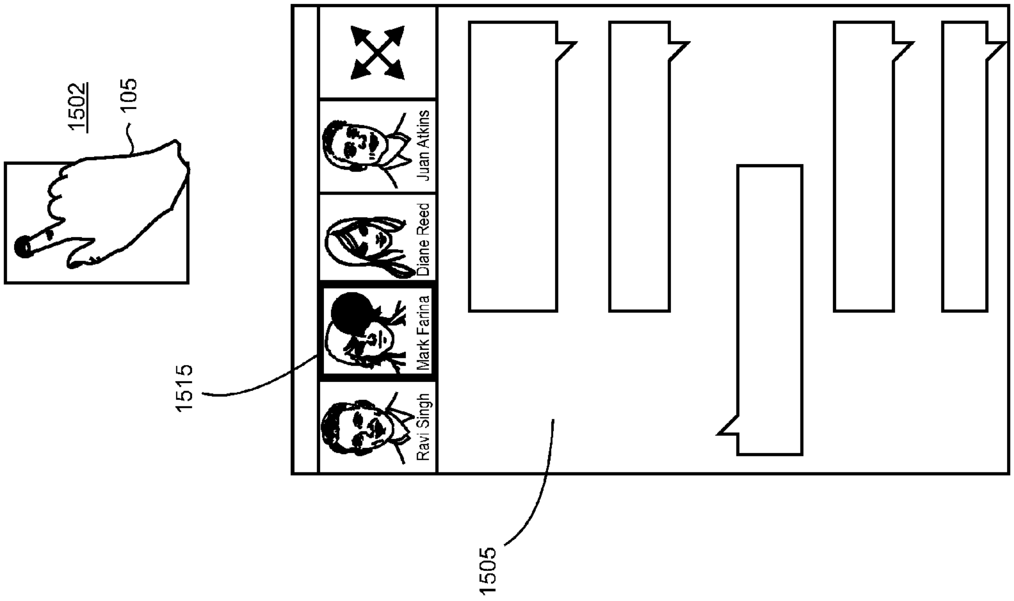
FIG. 15 illustratively shows how selection of a contact on the carousel brings up a corresponding chat card on the UI.

The carousel 805 may also be configured to be horizontally scrollable by the user as shown in FIGS. 13 and 14. In a similar manner as with the scrollable chat cards discussed above, additional contacts that are populated in the carousel 805 are logically ordered adjacent to the currently displayed contacts 1305. As shown in the inset drawings 1302 and 1304 in FIG. 13, in this illustrative example, the user 105 can drag the carousel to the right and/or left to reveal the additional contacts $\mathbf{1310}_{1 \ldots N}$. As the user drags the carousel 805, the highlighted contact and currently displayed contact card do not change, as shown in FIG. 14. Here, the carousel 805 is dragged to the right as shown in the inset drawing 1402 to reveal two additional contacts, but the highlight 1415 stays on the chat card for "Diane Reed" and the associated chat card 1405 continues to be displayed on the UI. As the user continues to scroll the carousel, the contact associated with the currently displayed chat card will not scroll out of view. Instead, the contact can be persisted or "stickied" on the edge of the carousel (e.g., on the left edge when the carousel is scrolled right and on the right edge when scrolled left) so that the highlighted contact remains in view during scrolling. Once the carousel scrolling is complete, the user 105 can touch another contact on the carousel 805, as shown in the inset drawing 1502 in FIG. 15, and the highlight 1515 and associated chat card 1505 are updated accordingly. The previously selected and highlighted contact then "unsticks" so that it can be scrolled out of view in subsequent scrolling actions by the user.

In typical implementations, the carousel is configured so that it does not logically wrap around itself in a continuous loop. That is, the carousel can have a defined start and a defined end and the user cannot scroll from the newest to the oldest conversations. In some cases, an animation or other indication can be provided to let the user know when the contact having the oldest conversation has been reached in the carousel. Similar devices can be also used to indicate the chat card having the oldest conversation has been reached. In some cases, sounds (e.g., clicks, etc.) may be played on the device to enhance the sense of carousel motion.

As discussed above, the carousel may be dynamically updated to change the sort order when new messages are received and new messages are generated. In typical implementations, however, updates in sort order of the carousel generally will not scroll the contact associated with the currently displayed chat card out of view. Instead, that contact can be stickied on the carousel, for example on the right side of the UI so that it remains visible even if the re-sorting resulting from new messages would otherwise cause the contact to be pushed off the visible portion of the carousel. When the user selects another contact and the currently displayed chat card changes, the previously selected and highlighted contact then unsticks so that it can be scrolled out of view as the carousel sort order is dynamically updated.

Figure 16:
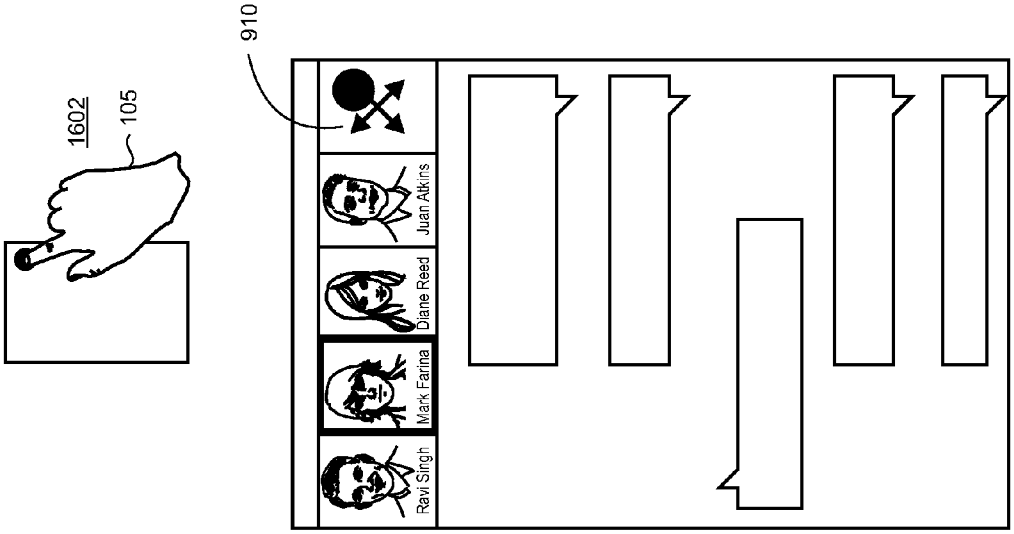
FIGS. 16 and 17 illustratively show how a control is exposed on the carousel that, when invoked, switches the UI to a list view.
Figure 17:
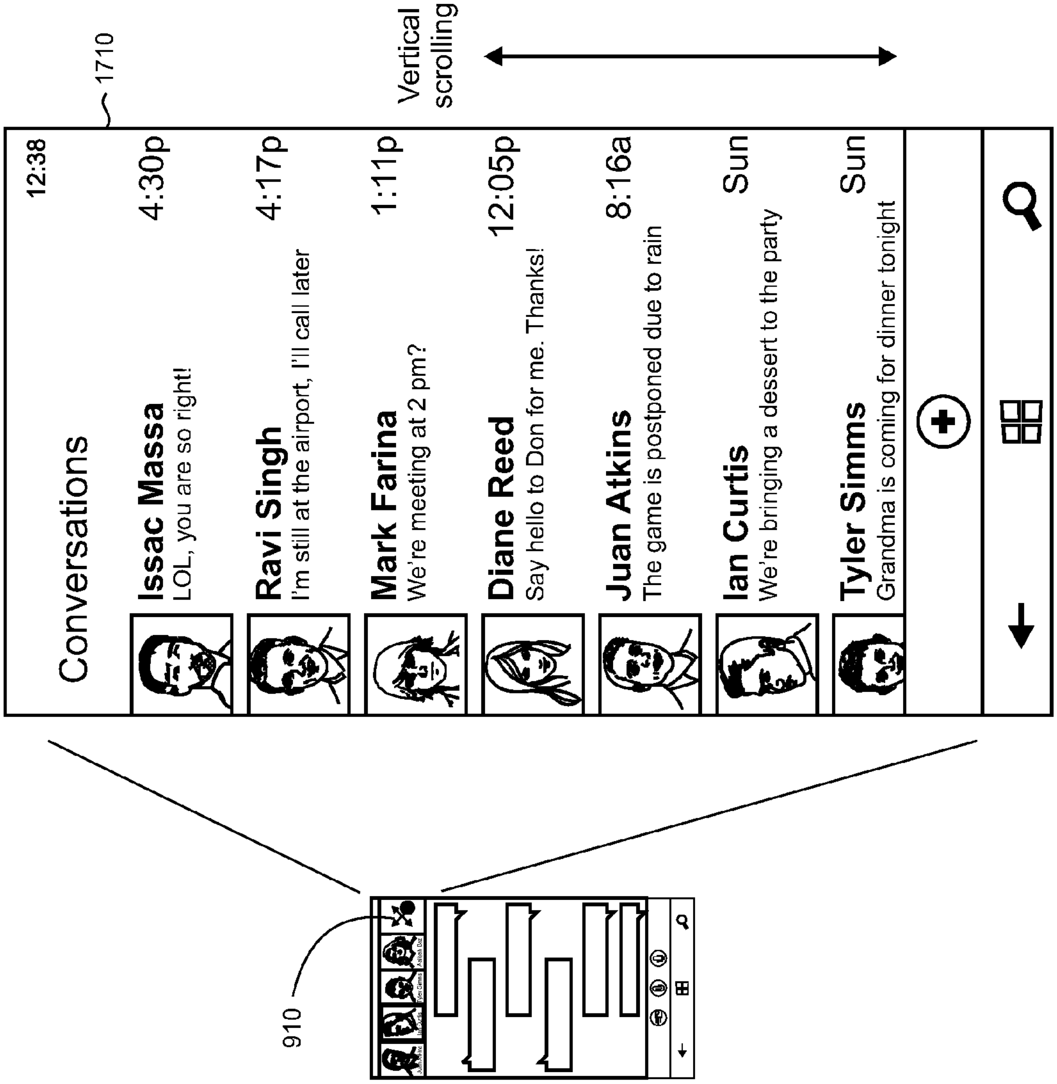

As noted above, button 910 can be manipulated by the user (using a touch as shown in the inset drawing 1602 in FIG. 16) to invoke additional functionality. In this illustrative example, when the user manipulates button 910 a vertically scrollable list view 1710 is displayed on the UI as shown in FIG. 17. The contacts are ordered in the same way as the carousel by conversation history so that the contact associated with a conversation having the most recent message is displayed at the top of the list. In typical implementations, the user 105 can return to the minimized conversation view with the carousel and chat cards by touching a contact image or name in the list view 1710.

Figure 18:
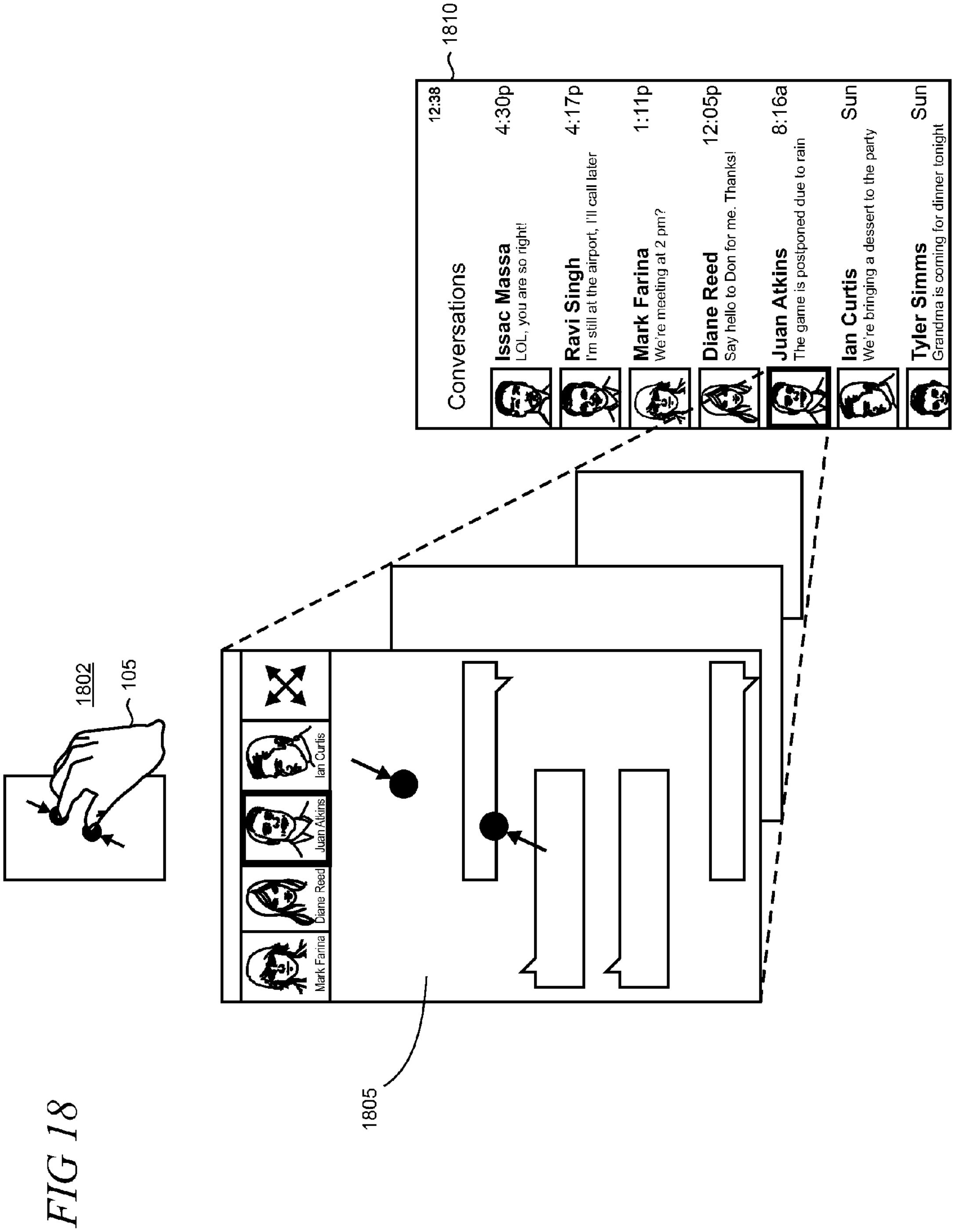
FIG. 18 illustratively shows the UI being switched to a list view using a zoom feature.

FIG. 18 shows an alternative arrangement for switching between the minimized conversation view and a list view. As shown in the inset drawing 1802, the user 105 can apply a multi-touch pinch gesture to zoom out from a current chat card 1805 to get to a vertically scrollable list view 1810 that is shown on the UI. As with the arrangement shown in FIG. 17, the user 105 can return to the minimized conversation view with the carousel and chat cards by touching a contact image or name in the list view 1810.

Figure 19:
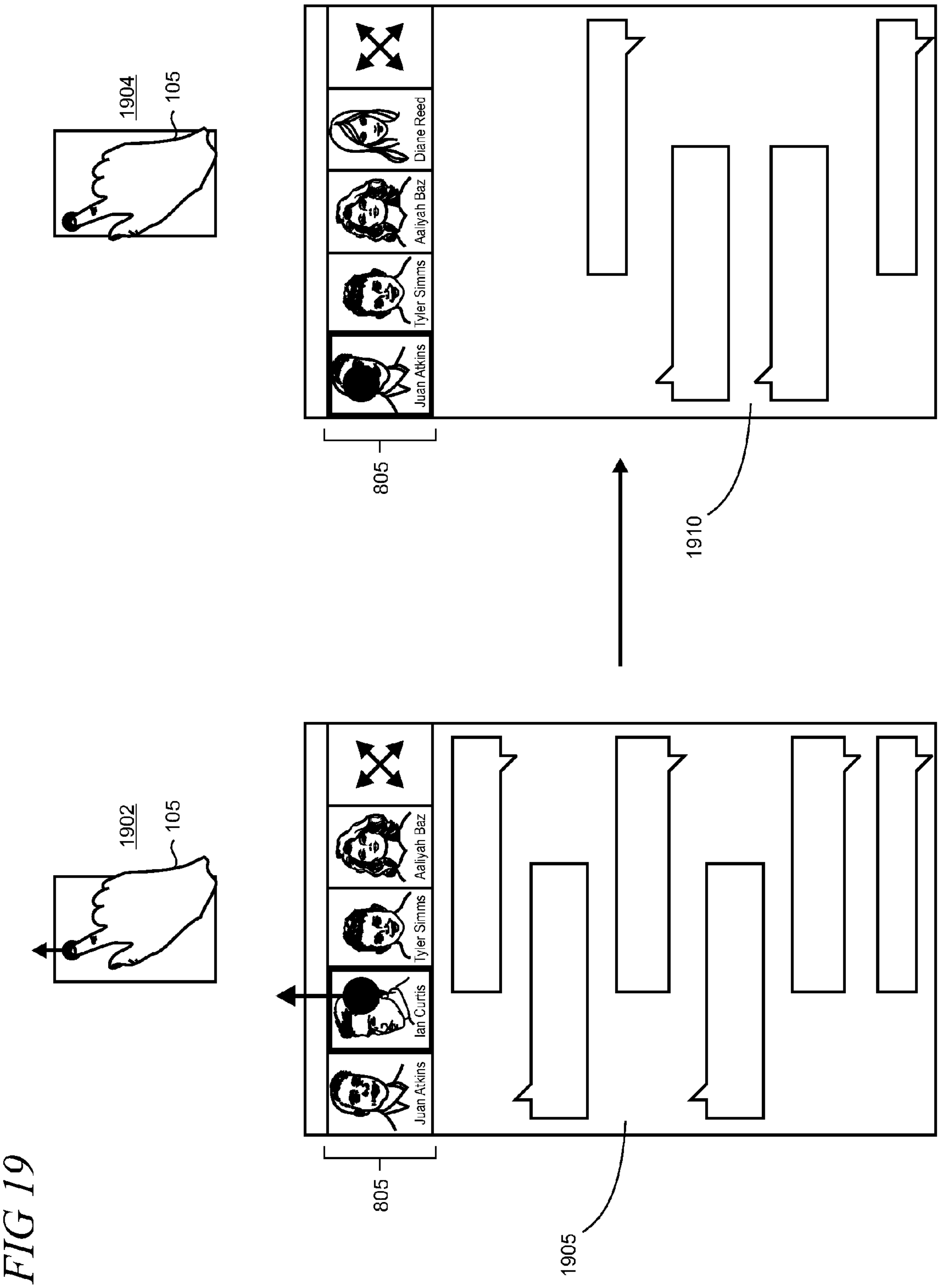
FIG. 19 illustratively shows a contact being removed from the carousel by a user.

FIG. 19 shows an illustrative arrangement in which the user 105 can remove a contact from the carousel 805 using a touch and flick gesture as shown in the inset drawing 1902. The messaging application 340 (FIG. 3) can then update the carousel 805 to reflect the removal of the contact and clear the associated contact card 1905 from the UI. The user can touch another contact on the carousel 805, as shown in the inset drawing 1904, to bring up its associated chat card 1910 on the UI.

Figure 20:
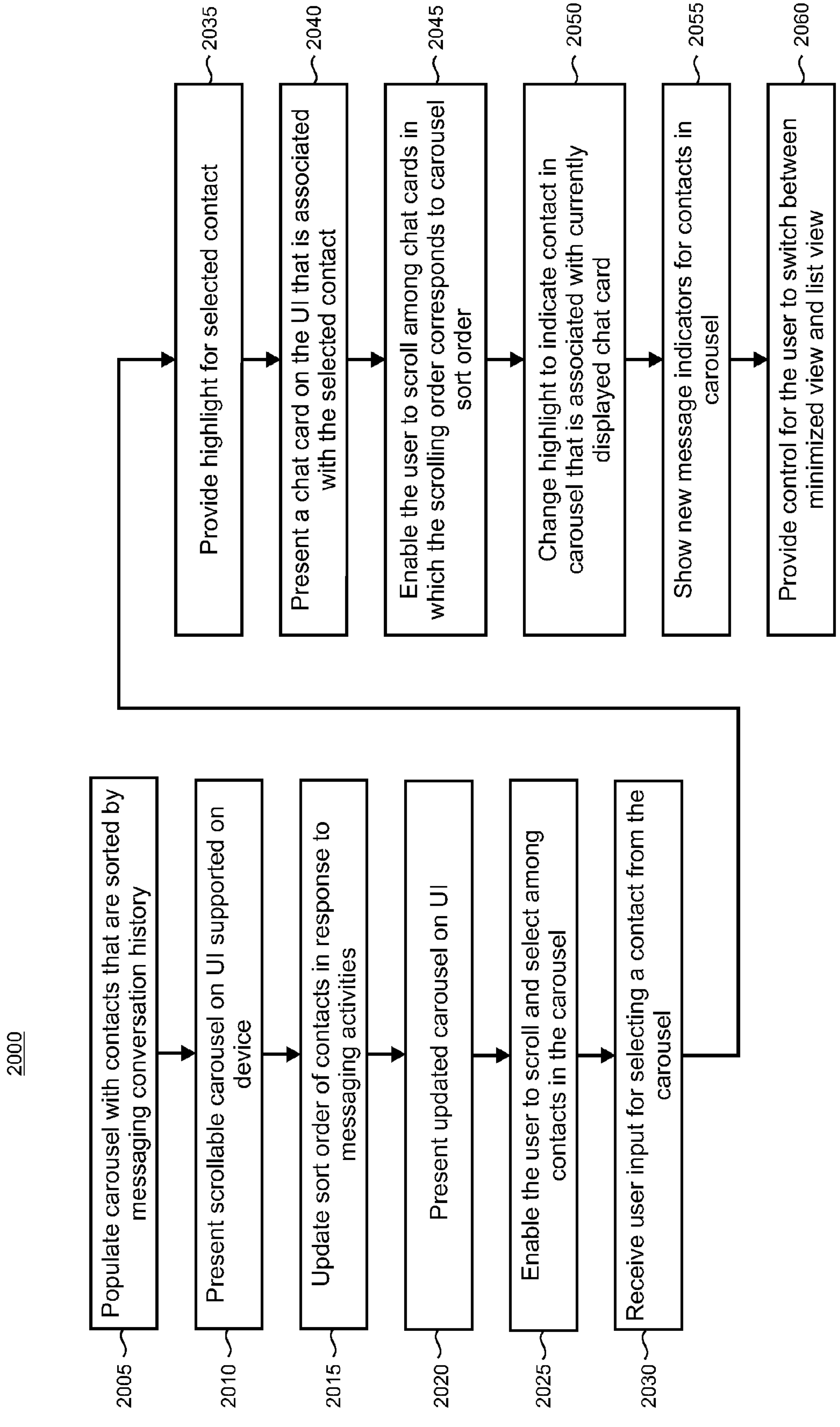
FIGS. 20, 21, and 22 show illustrative methods that may be performed when implementing the present quick navigation of message conversation history.

FIG. 20 shows a flowchart of an illustrative method 2000 for enabling navigation of messaging conversation histories that are available on a device 110 (FIG. 1). Unless specifically stated, the methods or steps shown in the flowcharts below and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2005, the carousel is populated with contacts that are sorted according to messaging conversation history. For example, a contact having a conversation with the most recent message (whether incoming or outgoing) can be positioned on the far left side of the carousel. The contact with the next most recent message in its history is placed to the right of the first contact, and so forth to fill the carousel. As noted above, various rules can be applied when populating the carousel to restrict and/or expand carousel membership, reflect actions and preferences of the user, etc. Typically, the carousel is automatically populated by the messaging application 340 (FIG. 3) without needing user interaction, although the degree of automation can vary by implementation.

In step 2010, a scrollable carousel is presented on the UI. In typical implementations, the carousel may be horizontally scrollable using inputs from the user or in accordance with operations performed by the messaging application 340. A monitor can be established to monitor messaging events and activities including the receipt of new incoming messages and the generation of new outgoing messages. In step 2015, the sort order of contacts in the carousel is updated responsively to the messaging activities and the updated carousel is presented on the UI in step 2020.

User enablement for scrolling the contacts in the carousel and selecting a contact is provided in step 2025, for example, by accepting touch-based gestures on the device's touchscreen. A user input for a contact selection is received in step 2030. The selected contact is highlighted on the carousel using one or more of color or other graphic treatments such as objects, icons, glyphs, animation, etc. in step 2035. A chat card associated with the selected contact is presented on the UI in step 2040. The chat card may be configured to be vertically scrollable in typical implementations.

User enablement for scrolling among chat cards is provided in step 2045. For example, the chat cards can be horizontally scrolled. The scrolling order may correspond to the sort order of the contacts in the carousel. In step 2050, as the chat cards are scrolled, the highlight is changed to reflect the contact in the carousel that is associated with the currently displayed chat card on the UI. New message indicators for contacts in the carousel may be displayed in step 2055, and one or more controls can be provided in step 2060 to enable the user to switch between the minimized view (that uses the contact carousel and chat cards) and a list view of the contacts.

Figure 21:
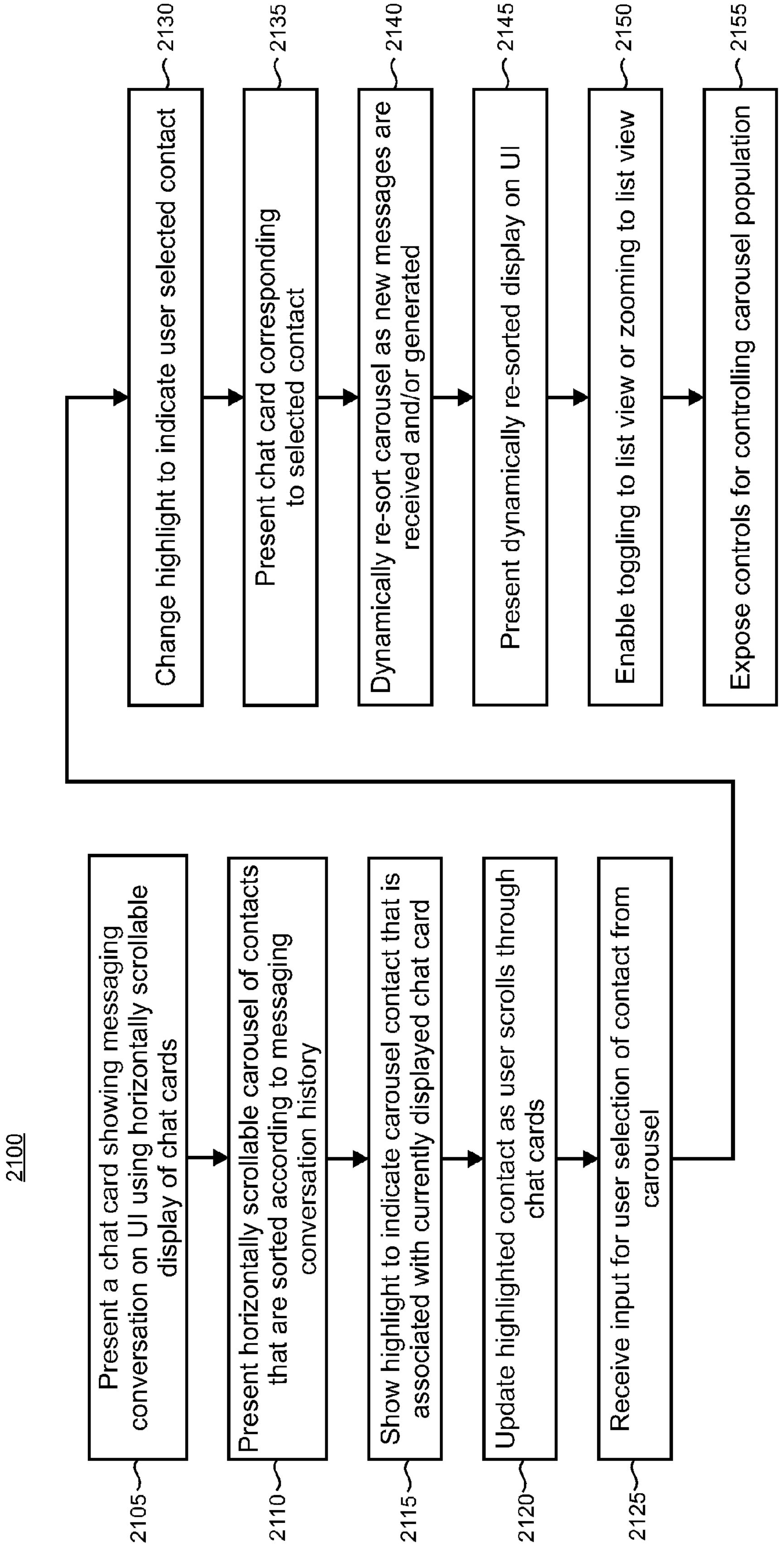

FIG. 21 shows a flowchart of an illustrative method 2100 for displaying a minimized view of messaging conversations that are available to a device. In step 2105, a chat card showing a messaging conversation is presented using a horizontally scrollable display. In step 2110, a horizontally scrollable carousel of contacts is presented in which the contacts are sorted by messaging history. A highlight is shown in step 2115 to indicate the carousel contact that is associated with the currently displayed chat card.

In step 2120, the highlight is updated to show the associated contact in the carousel as the user scrolls through the chat cards. In step 2125, an input is received that indicates a user selection of a contact on the carousel. In step 2130, the highlight is changed to indicate the user selected contact and the chat card corresponding to the selected contact is presented in step 2135.

The carousel may be dynamically re-sorted as new messages are received and/or new messages are generated in step 2140. In step 2145, the dynamically re-sorted carousel is presented on the UI. Enablement for toggling between the minimized view and the list view or zooming to the list view is provided in step 2150. In step 2155, controls are exposed so that the user can control the carousel population. This may include enabling the user to manually add and delete contacts from the carousel, set preferences as to how the carousel is to be populated, and the like.

Figure 22:
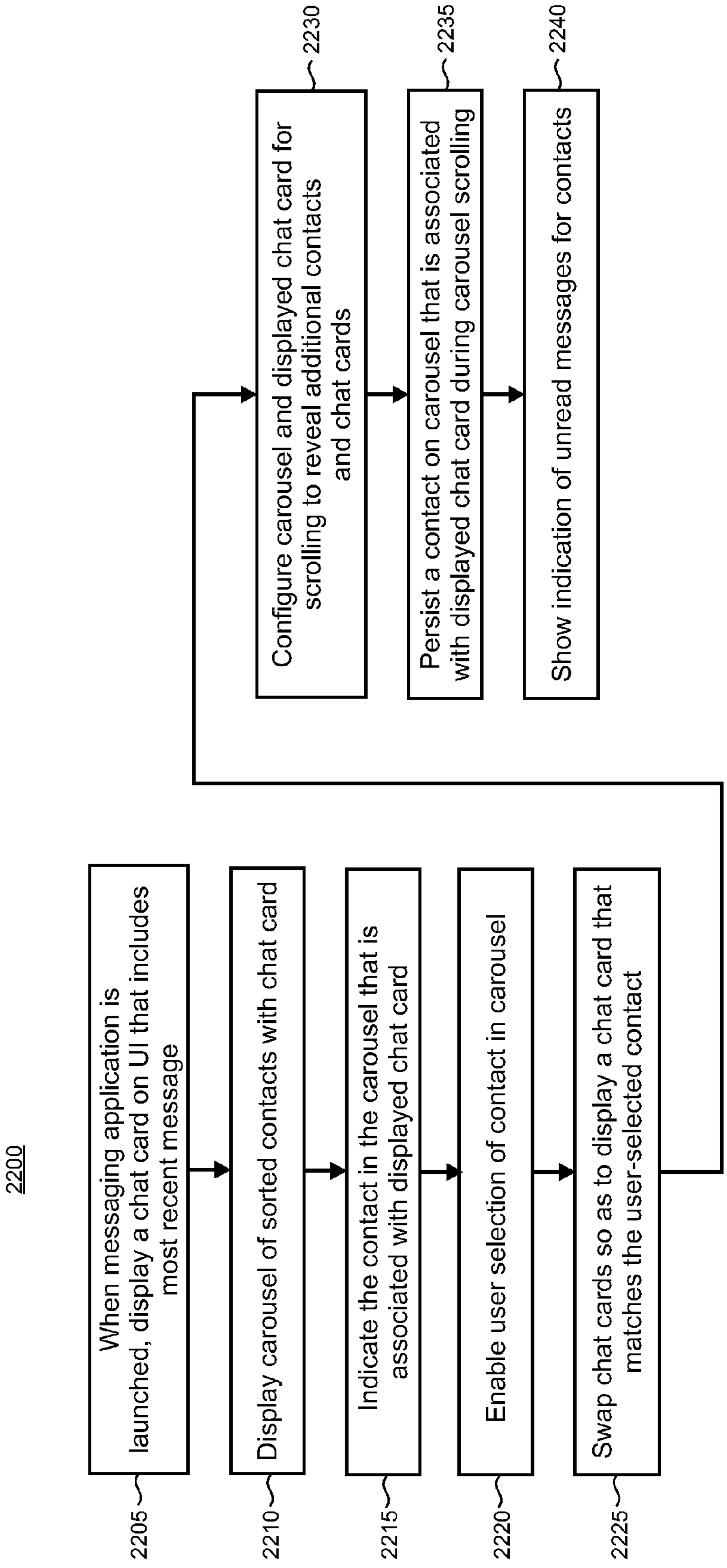

FIG. 22 shows a flowchart of an illustrative method 2200 for implementing a messaging application on a device. In step 2205, when the messaging application is initially launched, a chat card that contains the most recent message is displayed on the device UI. In step 2210, a carousel of contacts, sorted by messaging conversation history, is displayed with the chat card. The contact in the carousel that is associated with the chat card is indicated, for example using a highlight or similar device in step 2215. User selection of a contact in the carousel is enabled in step 2220. Chat cards are swapped out on the UI so that the displayed chat card matches the selected contact in step 2225.

The carousel and displayed chat cards are configured for scrolling to reveal additional contacts and chat cards in step 2230. As the carousel is scrolled by the user, the contact associated with the currently displayed chat card is persisted (i.e., "stickied") on the carousel in step 2235. An indication of unread messages associated with one or more contacts is shown in step 2240.

Figure 23:
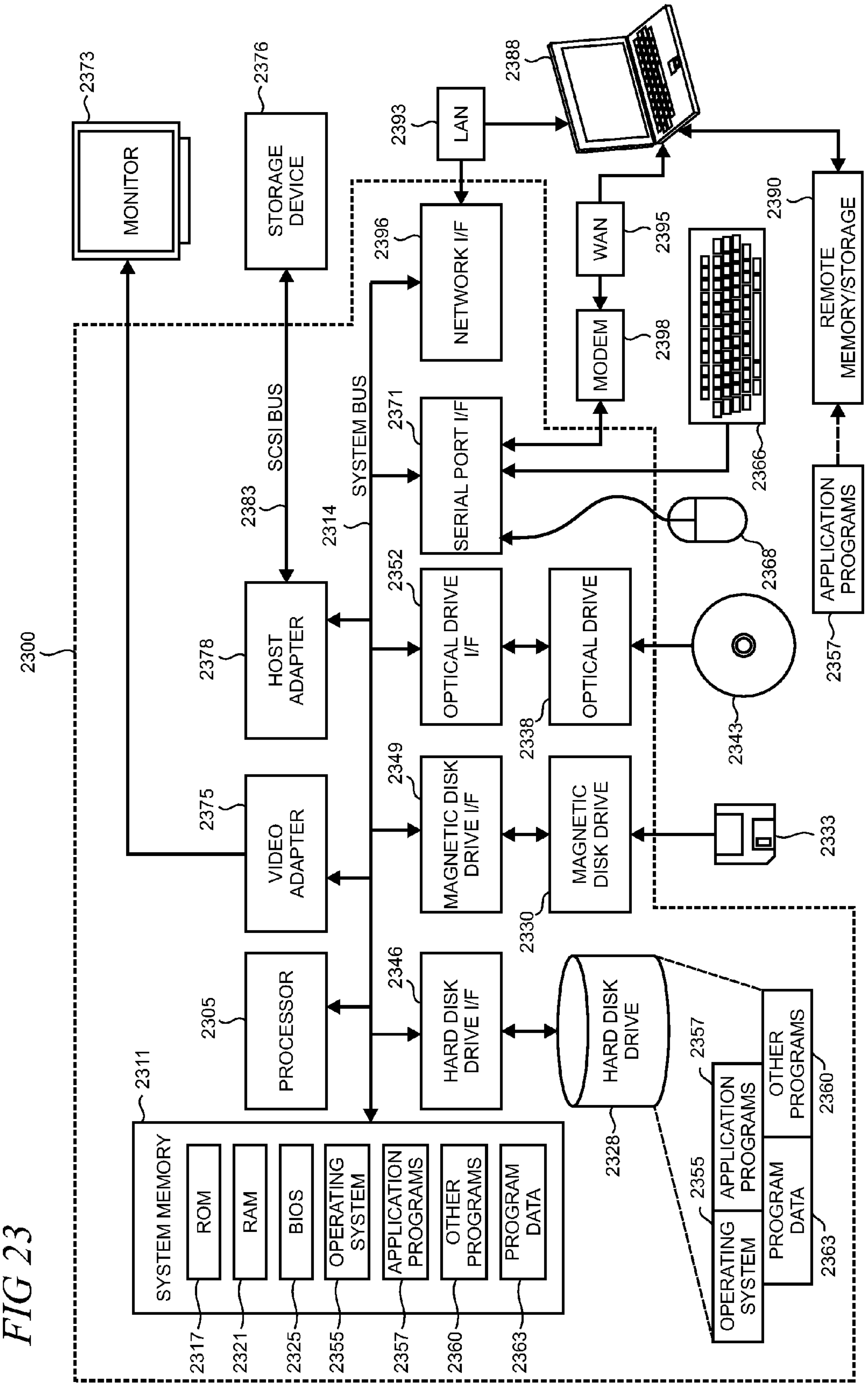
FIG. 23 is a simplified block diagram of an illustrative computer system such as a personal computer (PC) that may be used in part to implement the present quick navigation of message conversation history.

FIG. 23 is a simplified block diagram of an illustrative computer system 2300 such as a PC, client machine, or server with which the present quick navigation of message conversation history may be implemented. Computer system 2300 includes a processor 2305, a system memory 2311, and a system bus 2314 that couples various system components including the system memory 2311 to the processor 2305. The system bus 2314 may be any of several types of bus structures including a memory bus or memory controller, a peripheral bus, or a local bus using any of a variety of bus architectures. The system memory 2311 includes read only memory (ROM) 2317 and random access memory (RAM) 2321. A basic input/output system (BIOS) 2325, containing the basic routines that help to transfer information between elements within the computer system 2300, such as during startup, is stored in ROM 2317. The computer system 2300 may further include a hard disk drive 2328 for reading from and writing to an internally disposed hard disk (not shown), a magnetic disk drive 2330 for reading from or writing to a removable magnetic disk 2333 (e.g., a floppy disk), and an optical disk drive 2338 for reading from or writing to a removable optical disk 2343 such as a CD (compact disc), DVD (digital versatile disc), or other optical media. The hard disk drive 2328, magnetic disk drive 2330, and optical disk drive 2338 are connected to the system bus 2314 by a hard disk drive interface 2346, a magnetic disk drive interface 2349, and an optical drive interface 2352, respectively. The drives and their associated computer-readable storage media provide non-volatile storage of computer-readable instructions, data structures, program modules, and other data for the computer system 2300. Although this illustrative example includes a hard disk, a removable magnetic disk 2333, and a removable optical disk 2343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present quick navigation of message conversation history. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2333, optical disk 2343, ROM 2317, or RAM 2321, including an operating system 2355, one or more application programs 2357, other program modules 2360, and program data 2363. A user may enter commands and information into the computer system 2300 through input devices such as a keyboard 2366 and pointing device 2368 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 2305 through a serial port interface 2371 that is coupled to the system bus 2314, but may be connected by other interfaces, such as a parallel port, game port, or universal serial bus (USB). A monitor 2373 or other type of display device is also connected to the system bus 2314 via an interface, such as a video adapter 2375. In addition to the monitor 2373, personal computers typically include other peripheral output devices (not shown), such as speakers and printers. The illustrative example shown in FIG. 23 also includes a host adapter 2378, a Small Computer System Interface (SCSI) bus 2383, and an external storage device 2376 connected to the SCSI bus 2383.

The computer system 2300 is operable in a networked environment using logical connections to one or more remote computers, such as a remote computer 2388. The remote computer 2388 may be selected as another personal computer, a server, a router, a network PC, a peer device, or other common network node, and typically includes many or all of the elements described above relative to the computer system 2300, although only a single representative remote memory/storage device 2390 is shown in FIG. 23. The logical connections depicted in FIG. 23 include a local area network (LAN) 2393 and a wide area network (WAN) 2395. Such networking environments are often deployed, for example, in offices, enterprise-wide computer networks, intranets, and the Internet.

When used in a LAN networking environment, the computer system 2300 is connected to the local area network 2393 through a network interface or adapter 2396. When used in a WAN networking environment, the computer system 2300 typically includes a broadband modem 2398, network gateway, or other means for establishing communications over the wide area network 2395, such as the Internet. The broadband modem 2398, which may be internal or external, is connected to the system bus 2314 via a serial port interface 2371. In a networked environment, program modules related to the computer system 2300, or portions thereof, may be stored in the remote memory storage device 2390. It is noted that the network connections shown in FIG. 23 are illustrative and other means of establishing a communications link between the computers may be used depending on the specific requirements of an application of the present quick navigation of message conversation history.

Figure 24:
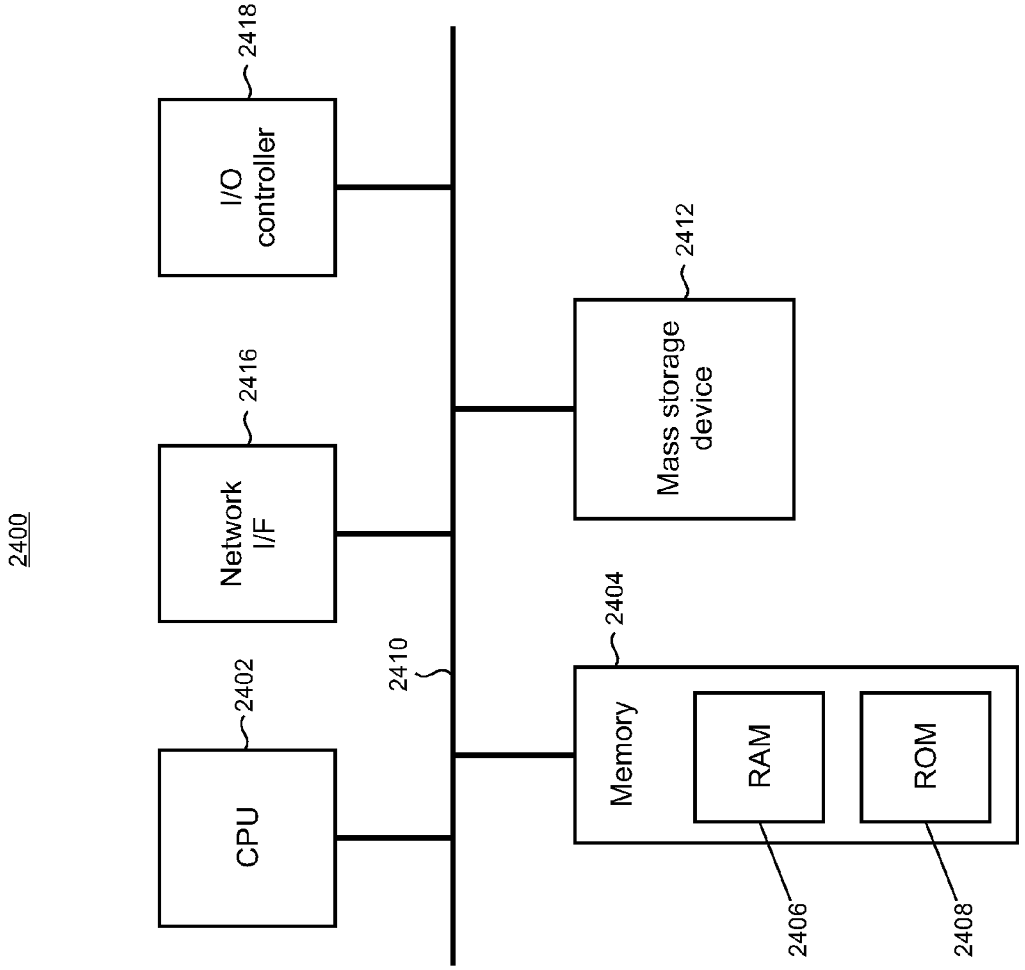
FIG. 24 shows a block diagram of an illustrative device that may be used in part to implement the present quick navigation of message conversation history.

FIG. 24 shows an illustrative architecture 2400 for a device capable of executing the various components described herein for providing the present quick navigation of message conversation history. Thus, the architecture 2400 illustrated in FIG. 24 shows an architecture that may be adapted for a server computer, mobile phone, a PDA, a smartphone, a desktop computer, a netbook computer, a tablet computer, GPS device, gaming console, and/or a laptop computer. The architecture 2400 may be utilized to execute any aspect of the components presented herein.

The architecture 2400 illustrated in FIG. 24 includes a CPU (Central Processing Unit) 2402, a system memory 2404, including a RAM 2406 and a ROM 2408, and a system bus 2410 that couples the memory 2404 to the CPU 2402. A basic input/output system containing the basic routines that help to transfer information between elements within the architecture 2400, such as during startup, is stored in the ROM 2408. The architecture 2400 further includes a mass storage device 2412 for storing software code or other computer-executed code that is utilized to implement applications, the file system, and the operating system.

The mass storage device 2412 is connected to the CPU 2402 through a mass storage controller (not shown) connected to the bus 2410. The mass storage device 2412 and its associated computer-readable storage media provide non-volatile storage for the architecture 2400.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2400.

According to various embodiments, the architecture 2400 may operate in a networked environment using logical connections to remote computers through a network. The architecture 2400 may connect to the network through a network interface unit 2416 connected to the bus 2410. It may be appreciated that the network interface unit 2416 also may be utilized to connect to other types of networks and remote computer systems. The architecture 2400 also may include an input/output controller 2418 for receiving and processing input from a number of other devices, including a keyboard, mouse, or electronic stylus (not shown in FIG. 24). Similarly, the input/output controller 2418 may provide output to a display screen, a printer, or other type of output device (also not shown in FIG. 24).

It may be appreciated that the software components described herein may, when loaded into the CPU 2402 and executed, transform the CPU 2402 and the overall architecture 2400 from a general-purpose computing system into a special-purpose computing system customized to facilitate the functionality presented herein. The CPU 2402 may be constructed from any number of transistors or other discrete circuit elements, which may individually or collectively assume any number of states. More specifically, the CPU 2402 may operate as a finite-state machine, in response to executable instructions contained within the software modules disclosed herein. These computer-executable instructions may transform the CPU 2402 by specifying how the CPU 2402 transitions between states, thereby transforming the transistors or other discrete hardware elements constituting the CPU 2402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2400 in order to store and execute the software components presented herein. It may also be appreciated that the architecture 2400 may include other types of computing devices, including handheld computers, embedded computer systems, smartphones, PDAs, and other types of computing devices known to those skilled in the art. It is also contemplated that the architecture 2400 may not include all of the components shown in FIG. 24, may include other components that are not explicitly shown in FIG. 24, or may utilize an architecture completely different from that shown in FIG. 24.

Figure 25:
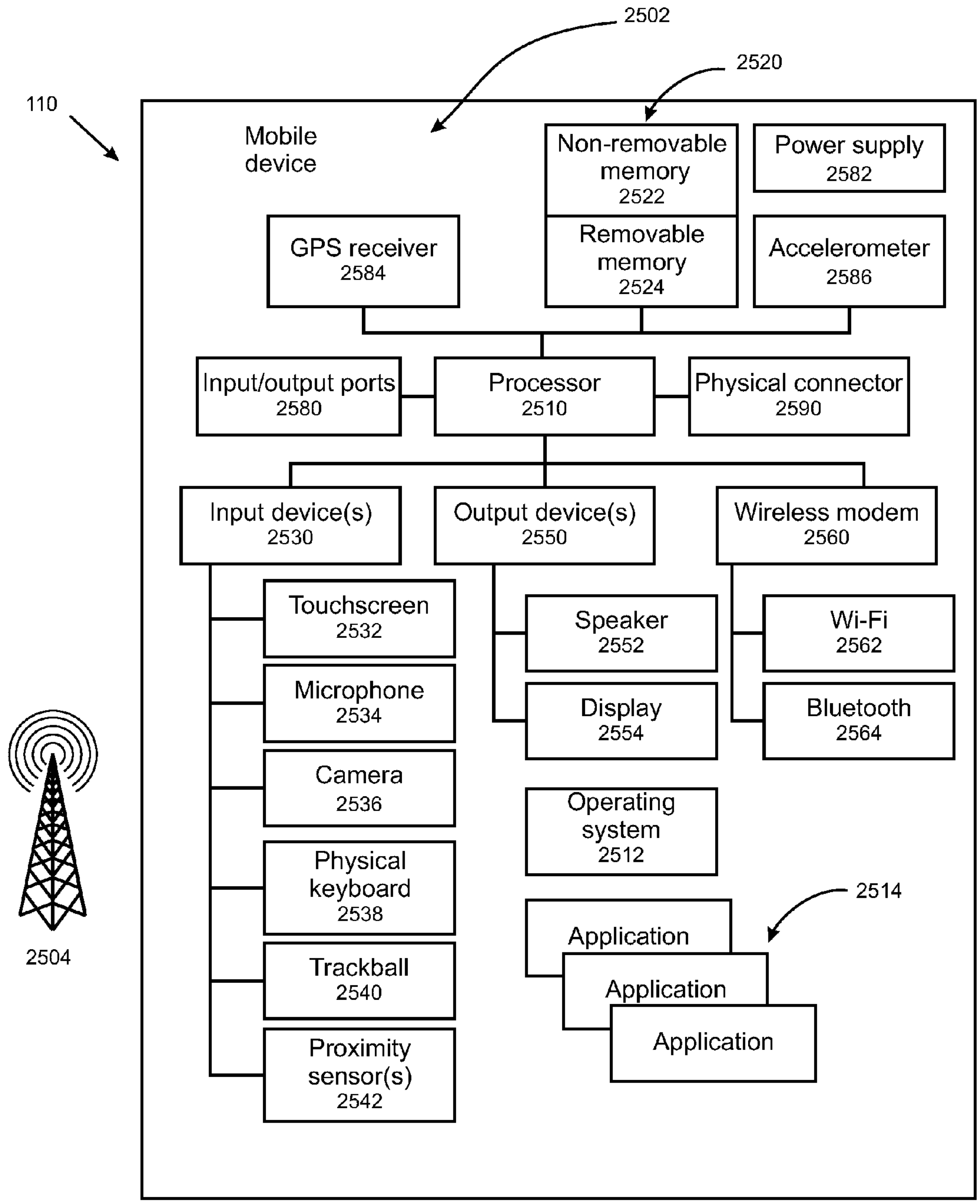
FIG. 25 is a block diagram of an illustrative mobile device.

FIG. 25 is a functional block diagram of an illustrative device 110 such as a mobile phone or smartphone including a variety of optional hardware and software components, shown generally at 2502. Any component 2502 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2504, such as a cellular or satellite network.

The illustrated device 110 can include a controller or processor 2510 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2512 can control the allocation and usage of the components 2502, including power states, above-lock states, and below-lock states, and provides support for one or more application programs 2514. The application programs can include common mobile computing applications (e.g., image-capture applications, email applications, calendars, contact managers, web browsers, messaging applications), or any other computing application.

The illustrated mobile device 110 can include memory 2520. Memory 2520 can include non-removable memory 2522 and/or removable memory 2524. The non-removable memory 2522 can include RAM, ROM, Flash memory, a hard disk, or other well-known memory storage technologies. The removable memory 2524 can include Flash memory or a Subscriber Identity Module (SIM) card, which is well known in GSM (Global System for Mobile communications) systems, or other well-known memory storage technologies, such as "smart cards." The memory 2520 can be used for storing data and/or code for running the operating system 2512 and the application programs 2514. Example data can include web pages, text, images, sound files, video data, or other data sets to be sent to and/or received from one or more network servers or other devices via one or more wired or wireless networks.

The memory 2520 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 2520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2530; such as a touch screen 2532; microphone 2534 for implementation of voice input for voice recognition, voice commands and the like; camera 2536; physical keyboard 2538; trackball 2540; and/or proximity sensor 2542; and one or more output devices 2550, such as a speaker 2552 and one or more displays 2554. Other input devices (not shown) using gesture recognition may also be utilized in some cases. Other possible output devices (not shown) can include piezoelectric or haptic output devices. Some devices can serve more than one input/output function. For example, touchscreen 2532 and display 2554 can be combined into a single input/output device.

A wireless modem 2560 can be coupled to an antenna (not shown) and can support two-way communications between the processor 2510 and external devices, as is well understood in the art. The modem 2560 is shown generically and can include a cellular modem for communicating with the mobile communication network 2504 and/or other radio-based modems (e.g., Bluetooth 2564 or Wi-Fi 2562). The wireless modem 2560 is typically configured for communication with one or more cellular networks, such as a GSM network for data and voice communications within a single cellular network, between cellular networks, or between the mobile device and a public switched telephone network (PSTN).

The mobile device can further include at least one input/output port 2580, a power supply 2582, a satellite navigation system receiver 2584, such as a GPS receiver, an accelerometer 2586, a gyroscope (not shown), and/or a physical connector 2590, which can be a USB port, IEEE 1394 (FireWire) port, and/or an RS-232 port. The illustrated components 2502 are not required or all-inclusive, as any components can be deleted and other components can be added.

Figure 26:
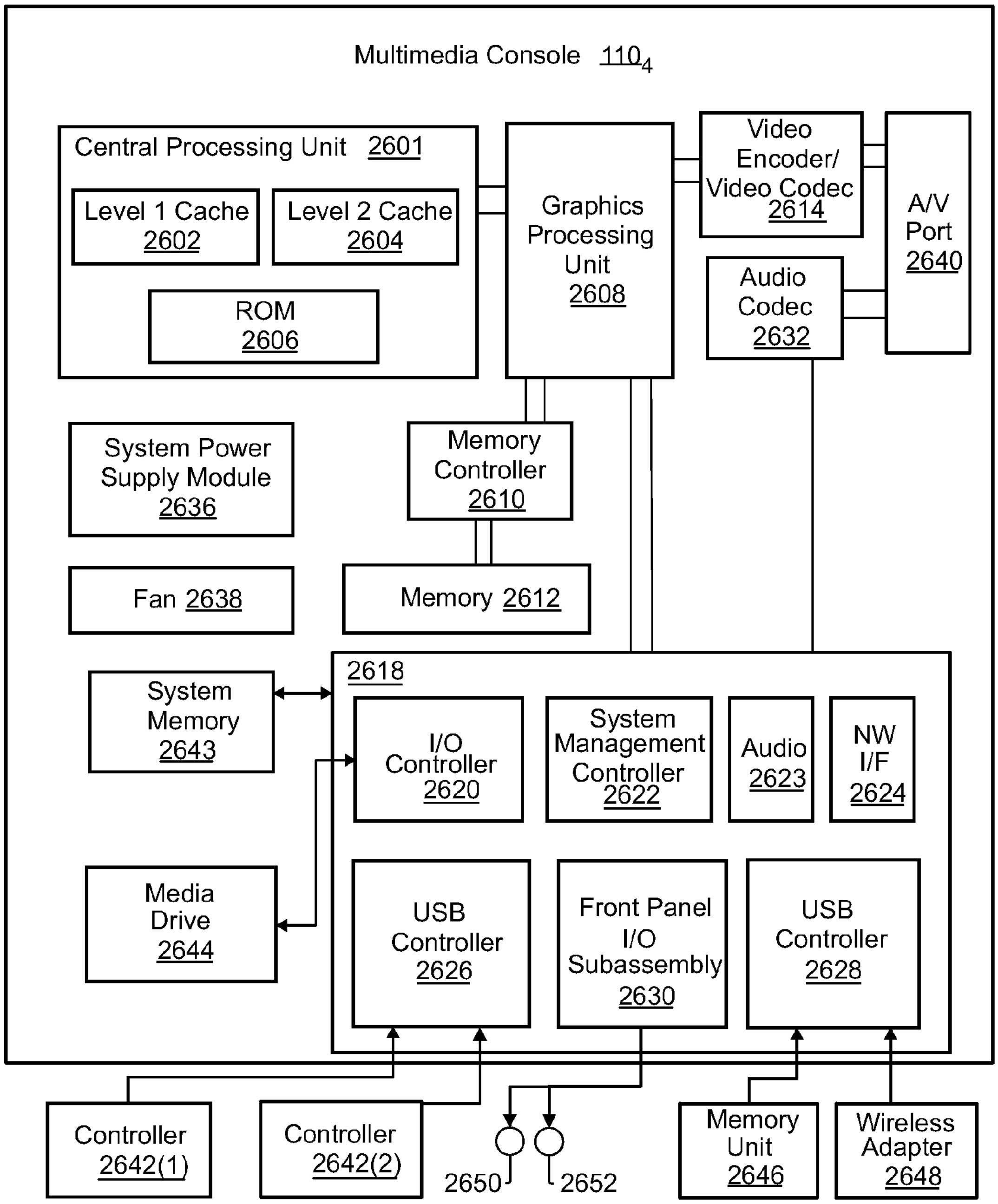
FIG. 26 is a block diagram of an illustrative multimedia console.

FIG. 26 is an illustrative functional block diagram of a multimedia console $\mathbf{110_4}$. The multimedia console $\mathbf{110_4}$ has a central processing unit (CPU) 2601 having a level 1 cache 2602, a level 2 cache 2604, and a Flash ROM (Read Only Memory) 2606. The level 1 cache 2602 and the level 2 cache 2604 temporarily store data and hence reduce the number of memory access cycles, thereby improving processing speed and throughput. The CPU 2601 may be configured with more than one core, and thus, additional level 1 and level 2 caches 2602 and 2604. The Flash ROM 2606 may store executable code that is loaded during an initial phase of a boot process when the multimedia console $\mathbf{110_4}$ is powered ON.

A graphics processing unit (GPU) 2608 and a video encoder/video codec (coder/decoder) 2614 form a video processing pipeline for high speed and high resolution graphics processing. Data is carried from the GPU 2608 to the video encoder/video codec 2614 via a bus. The video processing pipeline outputs data to an A/V (audio/video) port 2640 for transmission to a television or other display. A memory controller 2610 is connected to the GPU 2608 to facilitate processor access to various types of memory 2612, such as, but not limited to, a RAM.

The multimedia console $\mathbf{110_4}$ includes an I/O controller 2620, a system management controller 2622, an audio processing unit 2623, a network interface controller 2624, a first USB (Universal Serial Bus) host controller 2626, a second USB controller 2628, and a front panel I/O subassembly 2630 that are preferably implemented on a module 2618. The USB controllers 2626 and 2628 serve as hosts for peripheral controllers 2642(1) and 2642(2), a wireless adapter 2648, and an external memory device 2646 (e.g., Flash memory, external CD/DVD ROM drive, removable media, etc.). The network interface controller 2624 and/or wireless adapter 2648 provide access to a network (e.g., the Internet, home network, etc.) and may be any of a wide variety of various wired or wireless adapter components including an Ethernet card, a modem, a Bluetooth module, a cable modem, or the like.

System memory 2643 is provided to store application data that is loaded during the boot process. A media drive 2644 is provided and may comprise a DVD/CD drive, hard drive, or other removable media drive, etc. The media drive 2644 may be internal or external to the multimedia console $\mathbf{110_4}$. Application data may be accessed via the media drive 2644 for execution, playback, etc. by the multimedia console $\mathbf{110_4}$. The media drive 2644 is connected to the I/O controller 2620 via a bus, such as a Serial ATA bus or other high speed connection (e.g., IEEE 1394).

The system management controller 2622 provides a variety of service functions related to assuring availability of the multimedia console $\mathbf{110_4}$. The audio processing unit 2623 and an audio codec 2632 form a corresponding audio processing pipeline with high fidelity and stereo processing. Audio data is carried between the audio processing unit 2623 and the audio codec 2632 via a communication link. The audio processing pipeline outputs data to the A/V port 2640 for reproduction by an external audio player or device having audio capabilities.

The front panel I/O subassembly 2630 supports the functionality of the power button 2650 and the eject button 2652, as well as any LEDs (light emitting diodes) or other indicators exposed on the outer surface of the multimedia console $\mathbf{110_4}$. A system power supply module 2636 provides power to the components of the multimedia console $\mathbf{110_4}$. A fan 2638 cools the circuitry within the multimedia console $\mathbf{110_4}$.

The CPU 2601, GPU 2608, memory controller 2610, and various other components within the multimedia console $\mathbf{110_4}$ are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console $110_4$ is powered ON, application data may be loaded from the system memory 2643 into memory 2612 and/or caches 2602 and 2604 and executed on the CPU 2601. The application may present a graphical user interface that provides a consistent user experience when navigating to different media types available on the multimedia console $110_4$. In operation, applications and/or other media contained within the media drive 2644 may be launched or played from the media drive 2644 to provide additional functionalities to the multimedia console $110_4$.

The multimedia console $110_4$ may be operated as a standalone system by simply connecting the system to a television or other display. In this standalone mode, the multimedia console $110_4$ allows one or more users to interact with the system, watch movies, or listen to music. However, with the integration of broadband connectivity made available through the network interface controller 2624 or the wireless adapter 2648, the multimedia console $110_4$ may further be operated as a participant in a larger network community.

When the multimedia console $110_4$ is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console $110_4$ boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2642(1) and 2642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Based on the foregoing, it may be appreciated that technologies for quick navigation of message conversation history have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for enabling navigation of messaging conversation histories that are available on a mobile device that supports a user interface (UI) responsive to gestures of a mobile device user, comprising:

populating a carousel with contacts, each contact having an associated messaging conversation, the contacts being sorted in the carousel according to their messaging conversation histories;

presenting the carousel on a user interface (UI) supported on the mobile device, the presented carousel showing one or more contacts on the UI, the presented carousel being scrollable so that additional contacts are shown on the UI when the carousel is scrolled, the presented carousel being persistently displayed as different messaging conversations are presented on the UI;

presenting on the UI a messaging conversation associated with a selected contact on the carousel using a chat card;

enabling a user to scroll among chat cards, a scrolling order of the chat cards corresponding to the sort order of the contacts in the carousel, and further enabling the user to remove a contact from the carousel;

providing a control for the user to switch the UI to a list view of contacts and enabling the user to switch from the list view to a minimized view that includes the carousel;

updating the carousel contact sort order responsively to the removed contact and to messaging activities including receipt of inbound messages and generation of outbound messages; and presenting the updated carousel on the UI.

2. The method of claim 1 further including receiving an input from a user for selecting a contact on the carousel.

3. The method of claim 2 further including highlighting a selected contact on the carousel, the highlighting using one or more of color, graphic object, icon, glyph, or animation.

4. The method of claim 1 further including enabling a user to scroll among contacts shown on the carousel.

5. The method of claim 1 further including displaying a new message indicator for a contact in the carousel.

6. The method of claim 1 in which the messaging conversation histories use timestamps associated with incoming messages and outgoing messages and the contacts are sorted on the carousel using the timestamps.

7. A mobile device, comprising:

one or more processors;

a display that supports a user interface (UI) configured to enable a user of the mobile device to interact with the UI using gestures; and a memory storing computer-readable instructions which, when executed by the one or more processors, cause the mobile device to:

present a chat card on the UI using a horizontally scrollable display of chat cards, each chat card showing a messaging conversation between a mobile device user and one or more contacts, present a horizontally scrollable carousel of contacts, the contacts being sorted in the carousel according to their messaging conversation histories, show a highlight to indicate a contact in the carousel that is associated with a currently displayed chat card on the UI, enable a user to scroll among chat cards, a scrolling order of the chat cards corresponding to the sort order of the contacts in the carousel;

enable the user to remove a contact from the carousel, and update the sort order responsively to the removal;

provide a control for the user to switch the UI to a list view of contacts and enable the user to switch from the list view to a minimized view that includes the carousel;

responsively to user scrolling of the chat cards, update the highlighted contact in the carousel to indicate a contact associated with the currently displayed chat card on the UI, receive an input representing a user selection of a contact from the carousel, change the highlight to indicate the user selected contact, and present a corresponding chat card to the user selected contact on the UI.

8. The mobile device of claim 7 in which the display includes a touchscreen and user inputs comprise touch-based gestures.

9. The mobile device of claim 8 further including causing the mobile device to dynamically re-sort the carousel as new incoming messages are received or new outgoing messages are created and presenting the re-sorted carousel on the UI.

10. The mobile device of claim 9 further including causing the mobile device to receive a user input for switching the UI between the minimized view and a list view, the list view showing the contacts in sorted order in a vertically scrollable arrangement.

11. The mobile device of claim 10 in which the switching comprises one of toggling or zooming.

12. The mobile device of claim 11 further including causing the mobile device to expose controls to the user to control population of the carousel with contacts including contacts being added to the carousel and deleted from the carousel, the controls including controls for setting preferences.

13. One or more computer-readable memories storing instructions which, when executed by one or more processors disposed in a mobile device, cause the mobile device to:

expose a user interface (UI) that is responsive to gestures of a user of the mobile device;

upon launch of a messaging application, display a chat card showing a messaging conversation that includes a most recent message on the UI;

display a carousel of contacts with the chat card, the carousel showing contacts in a sorted order according to message history;

indicate a contact in the carousel that is associated with the displayed chat card;

enable the user to select a contact in the carousel;

enable the user to remove a contact from the carousel, and update the sort order responsively to the removal;

provide a control for the user to switch the UI to a list view of contacts and enable the user to switch from the list view to a minimized view that includes the carousel; and swap chat cards so as to display a chat card that matches the user-selected contact from the carousel.

14. The one or more computer-readable memories of claim 13 further including causing the mobile device to configure the carousel and displayed chat card to be scrollable by the user, the scrolling of the carousel revealing additional contacts and the scrolling of the chat card revealing additional chat cards.

15. The one or more computer-readable memories of claim 14 further including causing the mobile device to persist a contact on the carousel that is associated with a displayed chat card during carousel scrolling.

16. The one or more computer-readable memories of claim 13 further including causing the mobile device to show an indication of unread messages for one or more contacts on the carousel.

* * * * *